(12) United States Patent
Gulati et al.

(10) Patent No.: US 8,208,470 B2
(45) Date of Patent: *Jun. 26, 2012

(54) CONNECTIONLESS PACKET DATA TRANSPORT OVER A CONNECTION-BASED POINT-TO-POINT LINK

(75) Inventors: Manu Gulati, San Francisco, CA (US); Laurent Moll, San Jose, CA (US); Barton Sano, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/573,754

(22) Filed: Oct. 5, 2009

(65) Prior Publication Data

US 2010/0020816 A1 Jan. 28, 2010

Related U.S. Application Data

(63) Continuation of application No. 10/356,661, filed on Jan. 31, 2003, now Pat. No. 7,609,718.

(60) Provisional application No. 60/419,041, filed on Oct. 16, 2002, provisional application No. 60/380,740, filed on May 15, 2002.

(51) Int. Cl.
H04L 12/28 (2006.01)

(52) U.S. Cl. ........ 370/392; 370/466; 370/389; 370/252; 370/401; 710/315

(58) Field of Classification Search .................. 710/315, 710/312
See application file for complete search history.

(56) References Cited

U.S. PATENT DOCUMENTS

| | | | | |
|---|---|---|---|---|
| 5,995,121 A | * | 11/1999 | Alcorn et al. | 345/520 |
| 6,118,785 A | * | 9/2000 | Araujo et al. | 370/401 |
| 7,609,718 B2 | * | 10/2009 | Gulati et al. | 370/466 |
| 2006/0209897 A1 | * | 9/2006 | Joung | 370/474 |

* cited by examiner

*Primary Examiner* — Duc C Ho
(74) *Attorney, Agent, or Firm* — Garlick & Markison; Kevin L. Smith

(57) ABSTRACT

A multiple processor device generates a control packet for at least one connectionless-based packet in partial accordance with a control packet format of the connection-based point-to-point link and partially not in accordance with the control packet format. For instance, the multiple processor device generates the control packet to include, in noncompliance with the control packet format, one or more of an indication that at least one connectionless-based packet is being transported, an indication of a virtual channel of a plurality of virtual channels associated with the at least one connectionless-based packet, an indication of an amount of data included in the associated data packet, status of the at least one connectionless-based packet, and an error status indication. The multiple processor device then generates the associated data packet in accordance with a data packet format of the connection-based point-to-point link, wherein the data packet includes at least a portion of the at least one connectionless-based packet.

20 Claims, 19 Drawing Sheets processing system 10 processing system 20 processing system 30 multiple processor device 40 data mapping for I/O modules 62, 64, 70, and/or 72

Rx MAC module 60 or 66

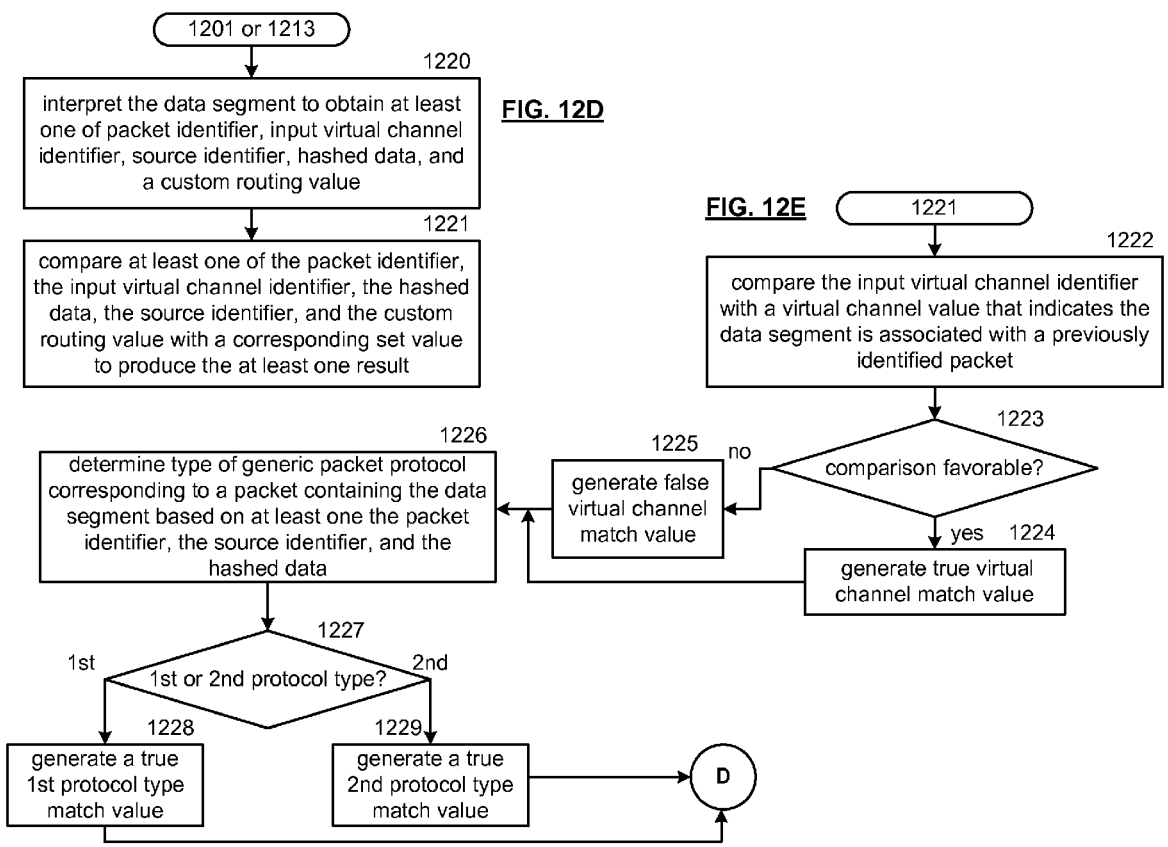

| bit-time | 7 | 6 | 5 | 4 | 3 | 2 | 1 | 0 |
|---|---|---|---|---|---|---|---|---|
| 0 | VC_ID[3:2] | | Cmd (indicate write command) | | | | | |
| 1 | passPW | VC_ID[1:0] | | Unit_ID | | | | |
| 2 | mask count [1:0] | | cmpt=0 | PoHT Source | | | | |
| 3 | status | | | | | mask count [3:2] | | |
| 4 | Node ID of originator of connectionless-based packet | | | | | | | |
| 5 | PoHT indication | | | | | | | |
| 6 | | | | | | | | |
| 7 | | | | | | | | |

FIG. 16
control packet 1600

CONNECTIONLESS PACKET DATA TRANSPORT OVER A CONNECTION-BASED POINT-TO-POINT LINK

CROSS REFERENCES TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 10/356,661, entitled "PACKET DATA SERVICE OVER HYPER TRANSPORT LINK(S)," filed Jan. 31, 2003, now issued as U.S. Pat. No. 7,609,718, on Oct. 27, 2009, which claims priority pursuant to 35 U.S.C. §119(e) to the following U.S. Provisional Patent Application which is hereby incorporated herein by reference in its entirety and made part of the present U.S. Utility Patent Application for all purposes:

(1) U.S. Provisional Application Ser. No. 60/380,740, entitled "SYSTEM ON A CHIP FOR NETWORKING," filed May 15, 2002, expired; and (2) U.S. Provisional Application Ser. No. 60/419,041, entitled "PACKET DATA SERVICE OVER HYPER-TRANSPORT LINKS," filed Oct. 16, 2002, expired.

BACKGROUND

1. Technical Field

The present invention relates generally to data communications and more particularly to high-speed wired data communications.

2. Description of Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, an USB (universal serial bus), SPI (system packet interface) among others. One relatively new communication technology for coupling relatively small groups of devices is the HyperTransport (HT) technology, previously known as the Lightning Data Transport (LDT) technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Of these devices that may be HT chained together, many require significant processing capability and significant memory capacity. Thus, these devices typically include multiple processors and have a large amount of memory. While a device or group of devices having a large amount of memory and significant processing resources may be capable of performing a large number of tasks, significant operational difficulties exist in coordinating the operation of multiple processors. While each processor may be capable of executing a large number operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multi-processor installation (node) is generally accepted and functions well in many environments.

However, network switches and web servers often times require more processing and storage capacity than can be provided by a single small group of processors sharing a processor bus. Thus, in some installations, a plurality processor/memory groups (nodes) is sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc.

While HT links provide high-speed connectivity for the above-mentioned devices and in other applications, they are inherently inefficient in some ways. For example, in a "legal" HT chain, one HT enabled device serves as a host bridge while other HT enabled devices serve as dual link tunnels and a single HT enabled device sits at the end of the HT chain and serves as an end-of-chain device (also referred to as an HT "cave"). According to the HT Standard, all communications must flow through the host bridge, even if the communication is between two adjacent devices in the HT chain. Thus, if an end-of-chain HT device desires to communicate with an adjacent HT tunnel, its transmitted communications flow first upstream to the host bridge and then flow downstream from the host bridge to the adjacent destination device. Such communication routing, while allowing the HT chain to be well managed, reduces the overall throughput achievable by the HT chain, increases latency of operations, and reduces concurrency of transactions.

Applications, including the above-mentioned devices, that otherwise benefit from the speed advantages of the HT chain are hampered by the inherent delays and transaction routing limitations of current HT chain operations. Because all transactions are serviced by the host bridge and the host a limited number of transactions it can process at a given time, transaction latency is a significant issue for devices on the HT chain, particularly so for those devices residing at the far end of the HT chain, i.e., at or near the end-of-chain device. Further, because all communications serviced by the HT chain, both upstream and downstream, must share the bandwidth provided by the HT chain, the HT chain may have insufficient total capacity to simultaneously service all required transactions at their required bandwidth(s). More-over, a limited number of transactions may be addressed at any time by any one device such as the host, e.g., 32 transactions (2**5). The host bridge is therefore limited in the number of transactions that it may have outstanding at any time and the host bridge may be unable to service all required transactions satisfactorily. Each of these operational limitations affects the ability of an HT chain to service the communications requirements of coupled devices.

Further, even if an HT enabled device were incorporated into a system (e.g., an HT enabled server, router, etc. were incorporated into an circuit-switched system or packet-switched system), it would be required to interface with a legacy device that uses an older communication protocol. For example, if a line card were developed with HT ports, the line card would need to communicate with legacy line cards that include SPI ports.

Therefore, a need exists for methods and/or apparatuses for interfacing devices using one or more communication protocols in one or more configurations while overcoming the bandwidth limitations, latency limitations, limited concurrency, and other limitations associated with the use of a high-speed HT chain.

SUMMARY

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

FIGS. 12A-12G are logic diagrams illustrating a method for routing of a plurality of data segments within a multiple processor device according to the present invention;

FIG. 16 is a schematic diagram of a control packet in accordance with the present invention.

DETAILED DESCRIPTION OF THE DRAWINGS

In an embodiment, a multiple processor device generates a control packet for at least one connectionless-based packet (e.g., IP packet, TCP/IP packet, ATM cell, etc.) in partial accordance with a control packet format of the connection-based point-to-point link and partially not in accordance with the control packet format.

For instance, the multiple processor device generates the control packet to include, in noncompliance with the control packet format, one or more of an indication that at least one connectionless-based packet is being transported, an indication of a virtual channel of a plurality of virtual channels associated with the at least one connectionless-based packet, an indication of an amount of data included in the associated data packet, status of the at least one connectionless-based packet, and an error status indication. The multiple processor device then generates the associated data packet in accordance with a data packet format of the connection-based point-to-point link, wherein the data packet includes at least a portion of the at least one connectionless-based packet.

In another embodiment, the multiple processor device may be coupled to at least one other multiple processor device via a HyperTransport (HT) link. In this embodiment, the multiple processor device generates a control packet for at least one connectionless-based packet (e.g., IP packet, TCP/IP packet, ATM cell, etc.) in partial accordance with HT protocol and partially not in accordance with the HT protocol. For instance, the multiple processor device generates the control packet to include, in noncompliance with the HT protocol, one or more of an indication that at least one connectionless-based packet is being transported, an indication of a virtual channel of a plurality of virtual channels associated with the at least one connectionless-based packet, an indication of an amount of data included in the associated data packet, status of the at least one connectionless-based packet, and an error status indication. The multiple processor device then generates the associated data packet in accordance with a data packet format of the HT protocol, wherein the data packet includes at least a portion of the at least one connectionless-based packet.

Figure 1:
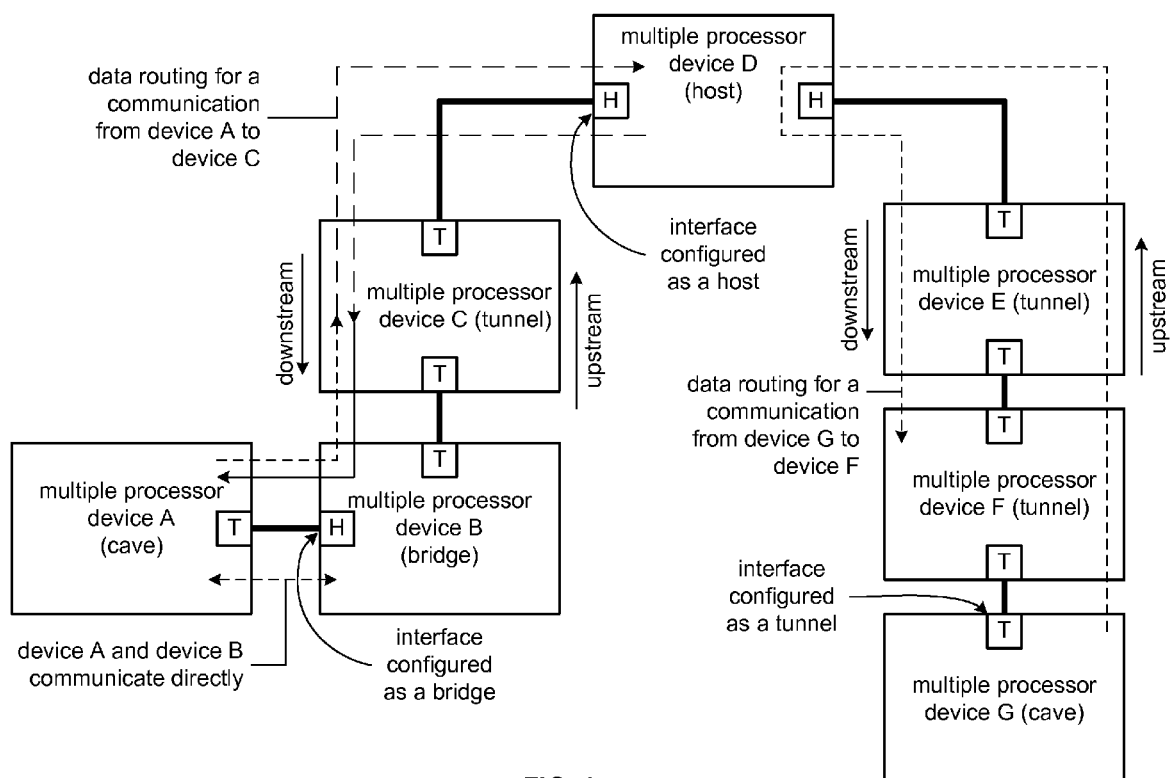
FIG. 1 is a schematic block diagram of a processing system in accordance with the present invention.

FIG. 1 is a schematic block diagram of a processing system 10 that includes a plurality of multiple processor devices A-G. Each of the multiple processor devices A-G include at least two interfaces, which, in this illustration, are labeled as T for tunnel functionality or H for host or bridge functionality. The details of the multiple processor devices A-G will be described in greater detail with reference to FIG. 4.

In this example of a processing system 10, multiple processor device D is functioning as a host to support two primary chains. The $1^{st}$ primary chain includes multiple processor device C, which is configured to provide a tunnel function, and multiple processor device B, which is configured to provide a bridge function. The other primary chain supported by device D includes multiple processor devices E and F, which are each configured to provide tunneling functionality, and multiple processor device G, which is configured to provide a cave function. The processing system 10 also includes a secondary chain that includes multiple processor devices A and B, where device A is configured to provide a cave function. Multiple processor device B functions as the host for the secondary chain. By convention, data from the devices (i.e., nodes) in a chain to the host device is referred to as upstream data and data from the host device to the node devices is referred to as downstream data.

In general, when a multiple processor device is providing a tunneling function, it passes, without interpretation, all packets received from downstream devices (i.e., the multiple processor devices that, in the chain, are further away from the host device) to the next upstream device (i.e., an adjacent multiple processor device that, in the chain, is closer to the host device). For example, multiple processor device E provides all upstream packets received from downstream multiple processor devices F and G to host device D without interpretation, even if the packets are addressing multiple processor device E. The host device D modifies the upstream packets to identify itself as the source of packets and sends the modified packets downstream along with any packets that it generated. As the multiple processor devices receive the downstream packets, they interpret the packet to identify the host device as the source and to identify a destination. If the multiple processor device is not the destination, it passes the downstream packets to the next downstream node. For example, packets received from the host device D that are directed to the multiple processor device E will be processed by the multiple processor device E, but device E will pass packets for devices F and G. The processing of packets by device E includes routing the packets to a particular processing unit within device E, routing to local memory, routing to external memory associated with device E, et cetera.

In this configuration, if multiple processor device G desires to send packets to multiple processor device F, the packets would traverse through devices E and F to host device D. Host device D modifies the packets identifying the multiple processor device D as the source of the packets and provides the modified packets to multiple processor device E, which would in turn forward them to multiple processor device F. A similar type of packet flow occurs for multiple processor device B communicating with multiple processor device C, for communications between devices G and E, and for communications between devices E and F.

For the secondary chain, devices A and B can communication directly, i.e., they support peer-to-peer communications therebetween. In this instance, the multiple processor device B has one of its interfaces (H) configured to provide a bridge function. Accordingly, the bridge functioning interface of device B interprets packets it receives from device A to determine the destination of the packet. If the destination is local to device B (i.e., meaning the destination of the packet is one of the modules within multiple processor device B or associated with multiple processor device B), the H interface processes the received packet. The processing includes forwarding the packet to the appropriate destination within, or associated with, device B.

If the packet is not destined for a module within device B, multiple processor device B modifies the packet to identify itself as the source of the packets. The modified packets are then forwarded to the host device D via device C, which is providing a tunneling function. For example, if device A desires to communicate with device C, device A provides packets to device B and device B modifies the packets to identify itself as the source of the packets. Device B then provides the modified packets to host device D via device C. Host device D then, in turn, modifies the packets to identify itself as the source of the packets and provides the again modified packets to device C, where the packets are subsequently processed. Conversely, if device C were to transmit packets to device A, the packets would first be sent to host D, modified by device D, and the modified packets would be provided back to device C. Device C, in accordance with the tunneling function, passes the packets to device B. Device B interprets the packets, identifies device A as the destination, and modifies the packets to identify device B as the source. Device B then provides the modified packets to device A for processing thereby.

In the processing system 10, device D, as the host, assigns a node ID (identification code) to each of the other multiple processor devices in the system. Multiple processor device D then maps the node ID to a unit ID for each device in the system, including its own node ID to its own unit ID. Accordingly, by including a bridging functionality in device B, in accordance with the present invention, the processing system 10 allows for interfacing between devices using one or more communication protocols and may be configured in one or more configurations while overcoming bandwidth limitations, latency limitations and other limitations associated with the use of high speed HyperTransport chains. Such communication protocols include, but are not limited to, a HyperTransport protocol, system packet interface (SPI) protocol and/or other types of packet-switched or circuit-switched protocols.

Figure 2:
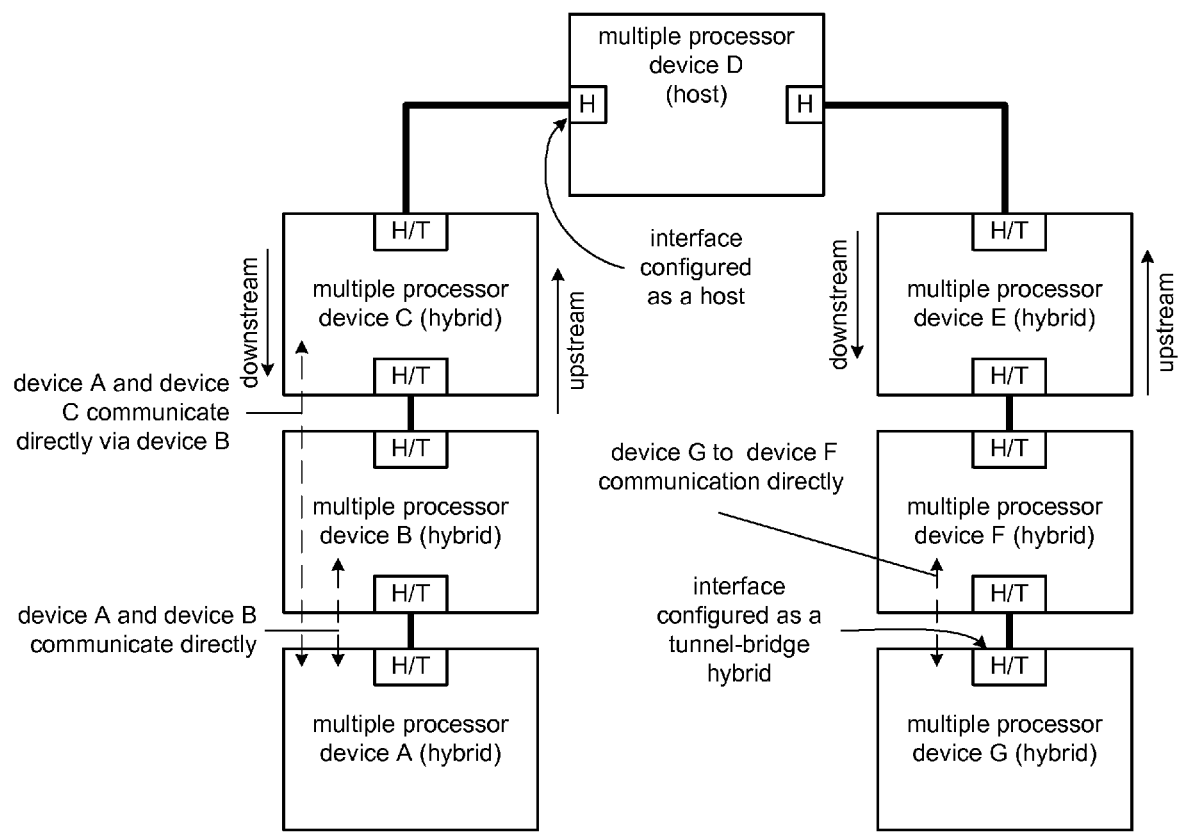
FIG. 2 is a schematic block diagram of an alternate processing system in accordance with the present invention.
Figure 4:
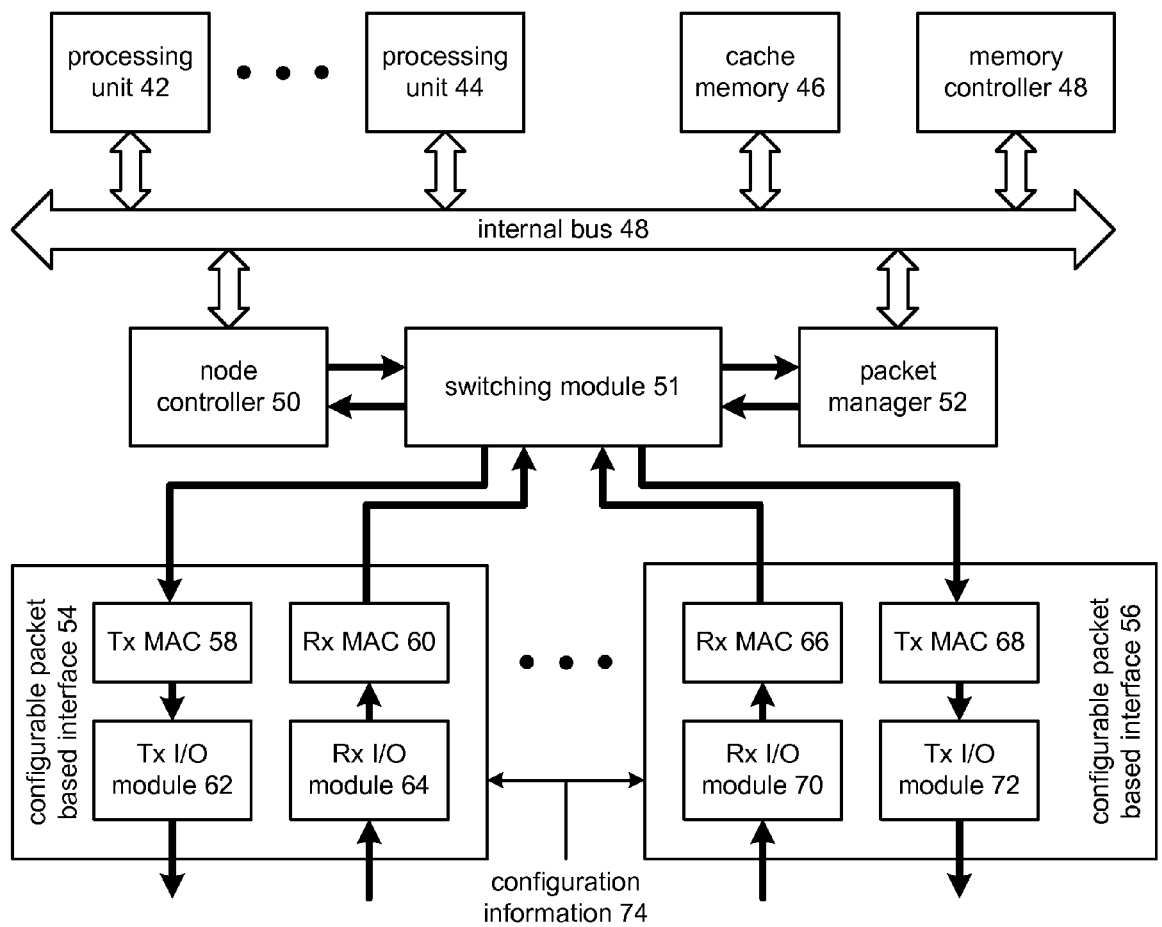
FIG. 4 is a schematic block diagram of a multiple processor device in accordance with the present invention.

FIG. 2 is a schematic block diagram of an alternate processing system 20 that includes a plurality of multiple processor devices A-G. In this system 20, multiple processor device D is the host device while the remaining devices are configured to support a tunnel-bridge hybrid interfacing functionality. Each of multiple processor devices A-C and E-G have their interfaces configured to support the tunnel-bridge hybrid (H/T) mode. With the interfacing configured in this manner, peer-to-peer communications may occur between multiple processor devices in a chain. For example, multiple processor device A may communicate directly with multiple processor device B and may communicate with multiple processor device C, via device B, without routing packets through the host device D. For peer-to-peer communication between devices A and B, multiple processor device B interprets the packets received from multiple processor device A to determine whether the destination of the packet is local to multiple processor device B. With reference to FIG. 4, a destination associated with multiple processor device B may be any one of the plurality of processing units 42-44, cache memory 46 or system memory accessible through the memory controller 48. Returning back to the diagram of FIG. 2, if the packets received from device A are destined for a module within device B, device B processes the packets by forwarding them to the appropriate module within device B. If the packets are not destined for device B, device B forwards them, without modifying the source of the packets, to multiple processor device C. As such, for this example, the source of packets remains device A.

The packets received by multiple processor device C are interpreted to determine whether a module within multiple processor device C is the destination of the packets. If so, device C processes them by forwarding the packets to the appropriate module within, or associated with, device C. If the packets are not destined for a module within device C, device C forwards them to the multiple processor device D. Device D modifies the packets to identify itself as the source of the packets and provides the modified packets to the chain including devices E-G. Note that device C, having interpreted the packets, passes only packets that are destined for a device other than itself in the upstream direction. Since device D is the only upstream device for the primary chain that includes device C, device D knows, based on the destination address, that the packets are for a device in the other primary chain.

Devices E-G, in order, interpret the modified packets to determine whether it is a destination of the modified packets. If so, the device processes the packets. If not, the device routes the packets to the next device in chain. In addition, devices E-G support peer-to-peer communications in a similar manner as devices A-C. Accordingly, by configuring the interfaces of the devices to support a tunnel-bridge hybrid function, the source of the packets is not modified (except when the communications are between primary chains of the system), which enables the devices to use one or more communication protocols (e.g., HyperTransport, system packet interface, et cetera) in a peer-to-peer configuration that substantially overcomes the bandwidth limitations, latency limitations and other limitations associated with the use of a conventional high-speed HyperTransport chain.

In general, a device configured as a tunnel-bridge hybrid has knowledge about which direction to send requests. For example, for device C to communicate with device A, device C knows that device A is downstream and is coupled to device B. As such, device C sends packets to device B for forwarding to device A as opposed to a traditional tunnel function, where device C would have to send packets for device A to device D, where device D would provide them back downstream after redefining itself as the source of the packets. To facilitate the more direct communications, each device maintains the address ranges, in range registers, for each link (or at least one of its links) and enforces ordering rules regardless of the Unit ID across its interfaces.

To facilitate the tunnel-hybrid functionality, since each device receives a unique Node ID, request packets are generated with the device's unique Node ID in the a Unit ID field of the packet. For packets that are forwarded upstream (or downstream), the Unit ID field and the source ID field of the request packets are preserved. As such, when the target device receives a request packet, the target device may accept the packet based on the address.

When the target device generates a response packet in response to a request packet(s), it uses the unique Node ID of the requesting device rather than the Node ID of the responding device. In addition, the responding device also preserves the Source Tag of the requesting device such that the response packet includes the Node ID and Source Tag of the requesting device. This enables the response packets to be accepted based on the Node ID rather than based on a bridge bit or direction of travel of the packet.

For a device to be configured as a tunnel-bridge hybrid, it export, at configuration of the system 20, a type 1 header (i.e., a bridge header in accordance with the HT specification) in addition to, or in place of, a type 0 header (i.e., a tunnel header in accordance with the HT specification). In response to the type 1 header, the host device programs the address range registers of the devices A-C and E-G regarding one or more links coupled to the devices. Once configured, the device utilizes the addresses in its address range registers to identify the direction (i.e., upstream link or downstream link) to send request packets and/or response packets to a particular device as described above.

Figure 3:
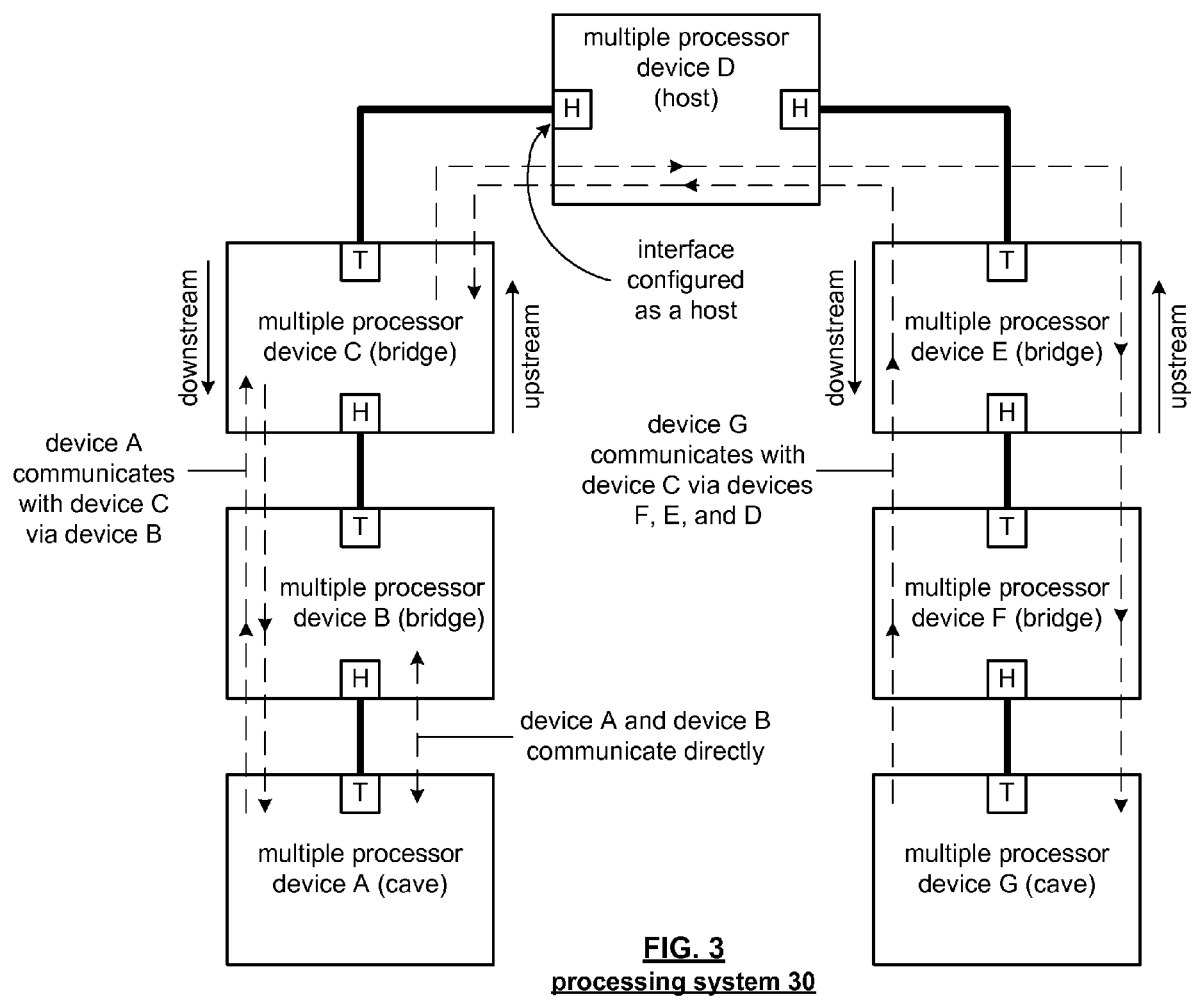
FIG. 3 is a schematic block diagram of another processing system in accordance with the present invention.

FIG. 3 is a schematic block diagram of processing system 30 that includes multiple processor devices A-G. In this embodiment, multiple processor device D is functioning as a host device for the system while the multiple processor devices B, C, E and F are configured to provide bridge functionality and devices A and G are configured to support a cave function. In this configuration, each of the devices may communicate directly (i.e., have peer-to-peer communication) with adjacent multiple processor devices via cascaded secondary chains. For example, device A may directly communicate with device B via a secondary chain therebetween, device B may communicate directly with device C via a secondary chain therebetween, device E may communicate directly with device F via a secondary chain therebetween, and device F may communicate directly with device G via a secondary chain therebetween. The primary chains in this example of a processing system exist between device D and device C and between device D and device E.

For communication between devices A and B, device B interprets packets received from device A to determine their destination. If device B is the destination, it processes it by providing it to the appropriate destination within, or associated with, device B. If a packet is not destined for device B, device B modifies the packet to identify itself as the source and forwards it to device C. Accordingly, if device A desires to communicate with device B, it does so directly since device B is providing a bridge function with respect to device A. However, for device A desires to communicate with device C, device B, as the host for the chain between devices A and B, modifies the packets to identify itself as the source of the packets. The modified packets are then routed to device C. To device C, the packets appear to be sourced from device B and not device A. For packets from device C to device A, device B modifies the packets to identify itself as the source of the packets and provides the modified packets to device A. In such a configuration, each device only knows that it is communicating with one device in the downstream direct and one device in the upstream direction. As such, peer-to-peer communication is supported directly between adjacent devices and is also supported indirectly (i.e., by modifying the packets to identify the host of the secondary chain as the source of the packets) between any devices in the system.

In any of the processing systems illustrated in FIGS. 1-3, the devices on one chain may communicate with devices on the other chain. An example of this is illustrated in FIG. 3 where device G may communicate with device C. As shown, packets from device G are propagated through devices D, E and F until they reach device C. Similarly, packets from device C are propagated through devices D, E and F until they reach device G. In the example of FIG. 3, the packets in the downstream direction and in the upstream direction are adjusted to modify the source of the packets. Accordingly, packets received from device G appear, to device C, to be originated by device D. Similarly, packets from device C appear, to device G, to be sourced by device F. As one of average skill in the art will appreciate, each device that is providing a host function or a bridge function maintains a table of communications for the chains it is the host to track the true source of the packets and the true destination of the packets.

FIG. 4 is a schematic block diagram of a multiple processor device 40 in accordance with the present invention. The multiple processor device 40 may be an integrated circuit or it may be constructed from discrete components. In either implementation, the multiple processor device 40 may be used as multiple processor device A-G in the processing systems illustrated in FIGS. 1-3.

The multiple processor device 40 includes a plurality of processing units 42-44, cache memory 46, memory controller 48, which interfaces with on and/or off-chip system memory, an internal bus 48, a node controller 50, a switching module 51, a packet manager 52, and a plurality of configurable packet based interfaces 54-56 (only two shown). The processing units 42-44, which may be two or more in numbers, may have a MIPS based architecture, to support floating point processing and branch prediction. In addition, each processing unit 42-44 may include a memory sub-system of an instruction cache and a data cache and may support separately, or in combination, one or more processing functions. With respect to the processing system of FIGS. 1-3, each processing unit 42-44 may be a destination within multiple processor device 40 and/or each processing function executed by the processing modules 42-44 may be a destination within the processor device 40.

The internal bus 48, which may be a 256 bit cache line wide split transaction cache coherent bus, couples the processing units 42-44, cache memory 46, memory controller 48, node controller 50 and packet manager 52 together. The cache memory 46 may function as an L2 cache for the processing units 42-44, node controller 50 and/or packet manager 52. With respect to the processing system of FIGS. 1-3, the cache memory 46 may be a destination within multiple processor device 40.

The memory controller 48 provides an interface to system memory, which, when the multiple processor device 40 is an integrated circuit, may be off-chip and/or on-chip. With respect to the processing system of FIGS. 1-3, the system memory may be a destination within the multiple processor device 40 and/or memory locations within the system memory may be individual destinations within the device 40. Accordingly, the system memory may include one or more destinations for the processing systems illustrated in FIGS. 1-3.

The node controller 50 functions as a bridge between the internal bus 48 and the configurable packet-based interfaces 54-56. Accordingly, accesses originated on either side of the node controller will be translated and sent on to the other. The node controller also supports the distributed shared memory model associated with the cache coherency non-uniform memory access (CC-NUMA) protocol.

The switching module 51 couples the plurality of configurable packet-based interfaces 54-56 to the node controller 50 and/or to the packet manager 52. The switching module 51 functions to direct data traffic, which may be in a generic format, between the node controller 50 and the configurable packet-based interfaces 54-56 and between the packet manager 52 and the configurable packet-based interfaces 54. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol.

The packet manager 52 may be a direct memory access (DMA) engine that writes packets received from the switching module 51 into input queues of the system memory and reads packets from output queues of the system memory to the appropriate configurable packet-based interface 54-56. The packet manager 52 may include an input packet manager and an output packet manager each having its own DMA engine and associated cache memory. The cache memory may be arranged as first in first out (FIFO) buffers that respectively support the input queues and output queues.

The configurable packet-based interfaces 54-56 generally function to convert data from a high-speed communication protocol (e.g., HT, SPI, etc.) utilized between multiple processor devices 40 and the generic format of data within the multiple processor devices 40. Accordingly, the configurable packet-based interface 54 or 56 may convert received HT or SPI packets into the generic format packets or data words for processing within the multiple processor device 40. In addition, the configurable packet-based interfaces 54 and/or 56 may convert the generic formatted data received from the switching module 51 into HT packets or SPI packets. The particular conversion of packets to generic formatted data performed by the configurable packet-based interfaces 54 and 56 is based on configuration information 74, which, for example, indicates configuration for HT to generic format conversion or SPI to generic format conversion.

Each of the configurable packet-based interfaces 54-56 includes a transmit media access controller (Tx MAC) 58 or 68, a receiver (Rx) MAC 60 or 66, a transmitter input/output (I/O) module 62 or 72, and a receiver input/output (I/O) module 64 or 70. In general, the transmit MAC module 58 or 68 functions to convert outbound data of a plurality of virtual channels in the generic format to a stream of data in the specific high-speed communication protocol (e.g., HT, SPI, etc.) format. The transmit I/O module 62 or 72 generally functions to drive the high-speed formatted stream of data onto the physical link coupling the present multiple processor device 40 to another multiple processor device. The transmit I/O module 62 or 72 is further described, and incorporated herein by reference, in co-pending patent application Ser. No. 10/305,648, entitled MULTI-FUNCTION INTERFACE AND APPLICATIONS THEREOF, and filed Nov. 27, 2002, now issued Oct. 26, 2004, as U.S. Pat. No. 6,809,547. The receive MAC module 60 or 66 generally functions to convert the received stream of data from the specific high-speed communication protocol (e.g., HT, SPI, etc.) format into data from a plurality of virtual channels having the generic format. The receive I/O module 64 or 70 generally functions to amplify and time align the high-speed formatted steam of data received via the physical link coupling the present multiple processor device 40 to another multiple processor device. The receive I/O module 64 or 70 is further described, and incorporated herein by reference, in co-pending patent application Ser. No. 10/306,558, entitled RECEIVER MULTI-PROTOCOL INTERFACE AND APPLICATIONS THEREOF, filed Nov. 27, 2002, and issued Nov. 27, 2007, as U.S. Pat. No. 7,302,505.

The transmit and/or receive MACs 58, 60, 66 and/or 68 may include, individually or in combination, a processing module and associated memory to perform its correspond functions. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the processing module executes, operational instructions corresponding to the functionality performed by the transmitter MAC 58 or 68 as disclosed, and incorporated herein by reference, in co-pending patent application Ser. No. 10/356,348, entitled TRANSMITTING DATA FROM A PLURALITY OF VIRTUAL CHANNELS VIA A MULTIPLE PROCESSOR DEVICE, filed Jan. 31, 2003, and corresponding to the functionality performed by the receiver MAC module 60 or 66 as further described in FIGS. 6-10.

In operation, the configurable packet-based interfaces 54-56 provide the means for communicating with other multiple processor devices 40 in a processing system such as the ones illustrated in FIG. 1, 2 or 3. The communication between multiple processor devices 40 via the configurable packet-based interfaces 54 and 56 is formatted in accordance with a particular high-speed communication protocol (e.g., Hyper-Transport (HT) or system packet interface (SPI)). The configurable packet-based interfaces 54-56 may be configured to support, at a given time, one or more of the particular high-speed communication protocols. In addition, the configurable packet-based interfaces 54-56 may be configured to support the multiple processor device 40 in providing a tunnel function, a bridge function, or a tunnel-bridge hybrid function.

When the multiple processor device 40 is configured to function as a tunnel-hybrid node, the configurable packet-based interface 54 or 56 receives the high-speed communication protocol formatted stream of data and separates, via the MAC module 60 or 68, the stream of incoming data into generic formatted data associated with one or more of a plurality a particular virtual channels. The particular virtual channel may be associated with a local module of the multiple processor device 40 (e.g., one or more of the processing units 42-44, the cache memory 46 and/or memory controller 48) and, accordingly, corresponds to a destination of the multiple processor device 40 or the particular virtual channel may be for forwarding packets to the another multiple processor device.

The interface 54 or 56 provides the generically formatted data words, which may comprise a packet, or portion thereof, to the switching module 51, which routes the generically formatted data words to the packet manager 52 and/or to node controller 50. The node controller 50, the packet manager 52 and/or one or more processing units 42-44 interprets the generically formatted data words to determine a destination therefor. If the destination is local to multiple processor device 40 (i.e., the data is for one of processing units 42-44, cache memory 46 or memory controller 48), the node controller 50 and/or packet manager 52 provides the data, in a packet format, to the appropriate destination. If the data is not addressing a local destination, the packet manager 52, node controller 50 and/or processing unit 42-44 causes the switching module 51 to provide the packet to one of the other configurable packet-based interfaces 54 or 56 for forwarding to another multiple processor device in the processing system. For example, if the data were received via configuration packet-based interface 54, the switching module 51 would provide the outgoing data to configurable packet-based interface 56. In addition, the switching module 51 provides outgoing packets generated by the local modules of processing module device 40 to one or more of the configurable packet-based interfaces 54-56.

The configurable packet-based interface 54 or 56 receives the generic formatted data via the transmitter MAC module 58 or 68. The transmitter MAC module 58, or 68 converts the generic formatted data from a plurality of virtual channels into a single stream of data. The transmitter input/output module 62 or 72 drives the stream of data on to the physical link coupling the present multiple processor device to another.

When the multiple processor device 40 is configured to function as a tunnel node, the data received by the configurable packet-based interfaces 54 from a downstream node is routed to the switching module 51 and then subsequently routed to another one of the configurable packet-based interfaces for transmission upstream without interpretation. For downstream transmissions, the data is interpreted to determine whether the destination of the data is local. If not, the data is routed downstream via one of the configurable packet-based interfaces 54 or 56.

When the multiple processor device 40 is configured as a bridge node, upstream packets that are received via a configurable packet-based interface 54 are modified via the interface 54, interface 56, the packet manager 52, the node controller 50, and/or processing units 42-44 to identify the current multiple processor device 40 as the source of the data. Having modified the source, the switching module 51 provides the modified data to one of the configurable packet-based interfaces for transmission upstream. For downstream transmissions, the multiple processor device 40 interprets the data to determine whether it contains the destination for the data. If so, the data is routed to the appropriate destination. If not, the multiple processor device 40 forwards the packet via one of the configurable packet-based interfaces 54 or 56 to a downstream device.

To determine the destination of the data, the node controller 50, the packet manager 52 and/or one of the processing units 42 or 44 interprets header information of the data to identify the destination (i.e., determines whether the target address is local to the device). In addition, a set of ordering rules of the received data is applied when processing the data, where processing includes forwarding the data, in packets, to the appropriate local destination or forwarding it onto another device. The ordering rules include the HT specification ordering rules and rules regarding non-posted commands being issued in order of reception. The rules further include that the interfaces are aware of whether they are configured to support a tunnel, bridge, or tunnel-bridge hybrid node. With such awareness, for every ordered pair of transactions, the receiver portion of the interface will not make a new transaction of an ordered pair visible to the switching module until the old transaction of an ordered pair has been sent to the switching module. The node controller, in addition to adhering to the HT specified ordering rules, treats all HT transactions as being part of the same input/output stream, regardless of which interface the transactions was received from. Accordingly, by applying the appropriate ordering rules, the routing to and from the appropriate destinations either locally or remotely is accurately achieved.

Figure 5:
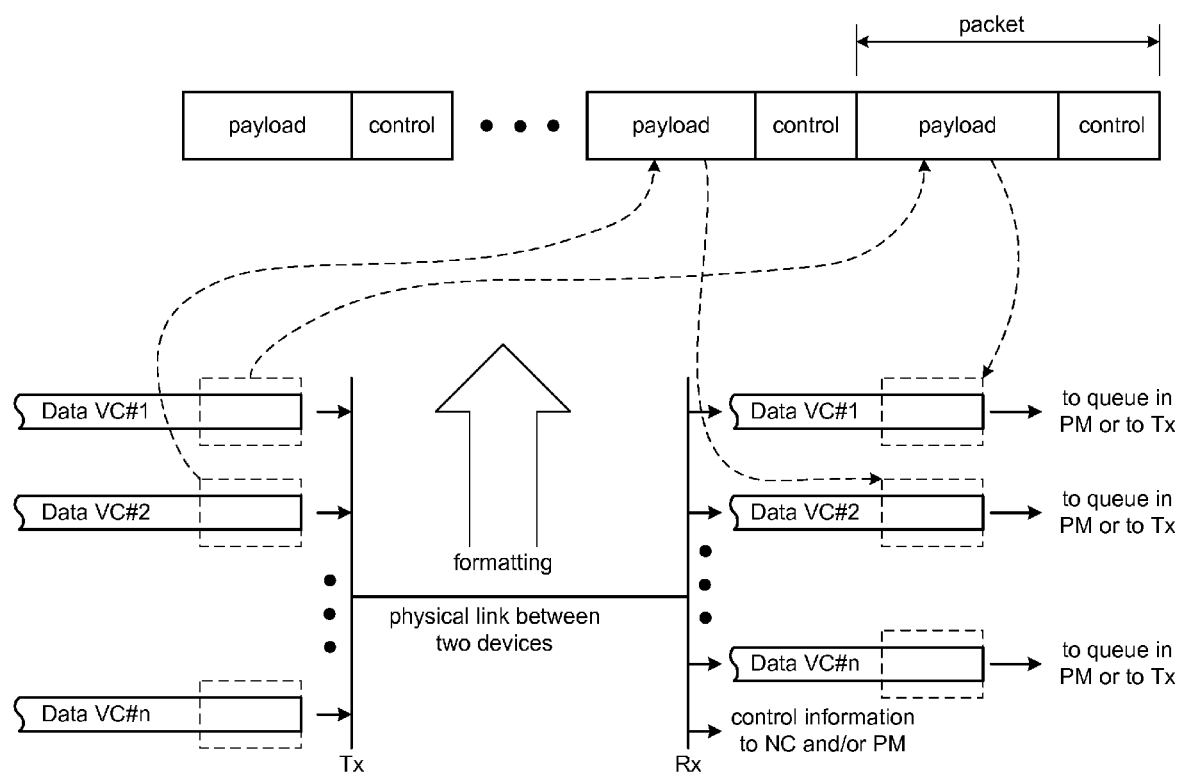
FIG. 5 is a graphical representation of transporting data between devices in accordance with the present invention.

FIG. 5 is a graphical representation of the functionality performed by the node controller 50, the switching module 51, the packet manager 52 and/or the configurable packet-based interfaces 54 and 56. In this illustration, data is transmitted over a physical link between two devices in accordance with a particular high-speed communication protocol (e.g., HT, SPI-4, etc.). Accordingly, the physical link supports a protocol that includes a plurality of packets. Each packet includes a data payload and a control section. The control section may include header information regarding the payload, control data for processing the corresponding payload of a current packet, previous packet(s) or subsequent packet(s), and/or control data for system administration functions.

Within a multiple processor device, a plurality of virtual channels may be established. A virtual channel may correspond to a particular physical entity, such as processing units 42-44, cache memory 46 and/or memory controller 48, and/or to a logical entity such as a particular algorithm being executed by one or more of the processing modules 42-44, particular memory locations within cache memory 46 and/or particular memory locations within system memory accessible via the memory controller 48. In addition, one or more virtual channels may correspond to data packets received from downstream or upstream nodes that require forwarding. Accordingly, each multiple processor device supports a plurality of virtual channels. The data of the virtual channels, which is illustrated as data virtual channel number 1 (VC#1), virtual channel number 2 (VC#2) through virtual channel number N (VC#n) may have a generic format. The generic format may be 8 byte data words, 16 byte data words that correspond to a proprietary protocol, ATM cells, IP packets, TCP/IP packets, other packet switched protocols and/or circuit switched protocols.

As illustrated, a plurality of virtual channels is sharing the physical link between the two devices. The multiple processor device 40, via one or more of the processing units 42-44, node controller 50, the interfaces 54-56, and/or packet manager 52 manages the allocation of the physical link among the plurality of virtual channels. As shown, the payload of a particular packet may be loaded with one or more segments from one or more virtual channels. In this illustration, the $1^{st}$ packet includes a segment, or fragment, of virtual channel number 1. The data payload of the next packet receives a segment, or fragment, of virtual channel number 2. The allocation of the bandwidth of the physical link to the plurality of virtual channels may be done in a round-robin fashion, a weighted round-robin fashion or some other application of fairness. The data transmitted across the physical link may be in a serial format and at extremely high data rates (e.g., 3.125 gigabits-per-second or greater), in a parallel format, or a combination thereof (e.g., 4 lines of 3.125 Gbps serial data).

At the receiving device, the stream of data is received and then separated into the corresponding virtual channels via the configurable packet-based interface, the switching module 51, the node controller 50, the interfaces 54-56, and/or packet manager 52. The recaptured virtual channel data is either provided to an input queue for a local destination or provided to an output queue for forwarding via one of the configurable packet-based interfaces to another device. Accordingly, each of the devices in a processing system as illustrated in FIGS. 1-3 may utilize a high speed serial interface, a parallel interface, or a plurality of high speed serial interfaces, to transceive data from a plurality of virtual channels utilizing one or more communication protocols and be configured in one or more configurations while substantially overcoming the bandwidth limitations, latency limitations, limited concurrency (i.e., renaming of packets) and other limitations associated with the use of a high speed HyperTransport chain. Configuring the multiple processor devices for application in the multiple configurations of processing systems is described in greater detail and incorporated herein by reference in co-pending patent application Ser. No. 10/356,390, entitled MULTIPLE PROCESSOR INTEGRATED CIRCUIT HAVING CONFIGURABLE PACKET-BASED INTERFACES, filed Jan. 31, 2003, and having the same filing date and priority date as the present patent application.

Figure 6:
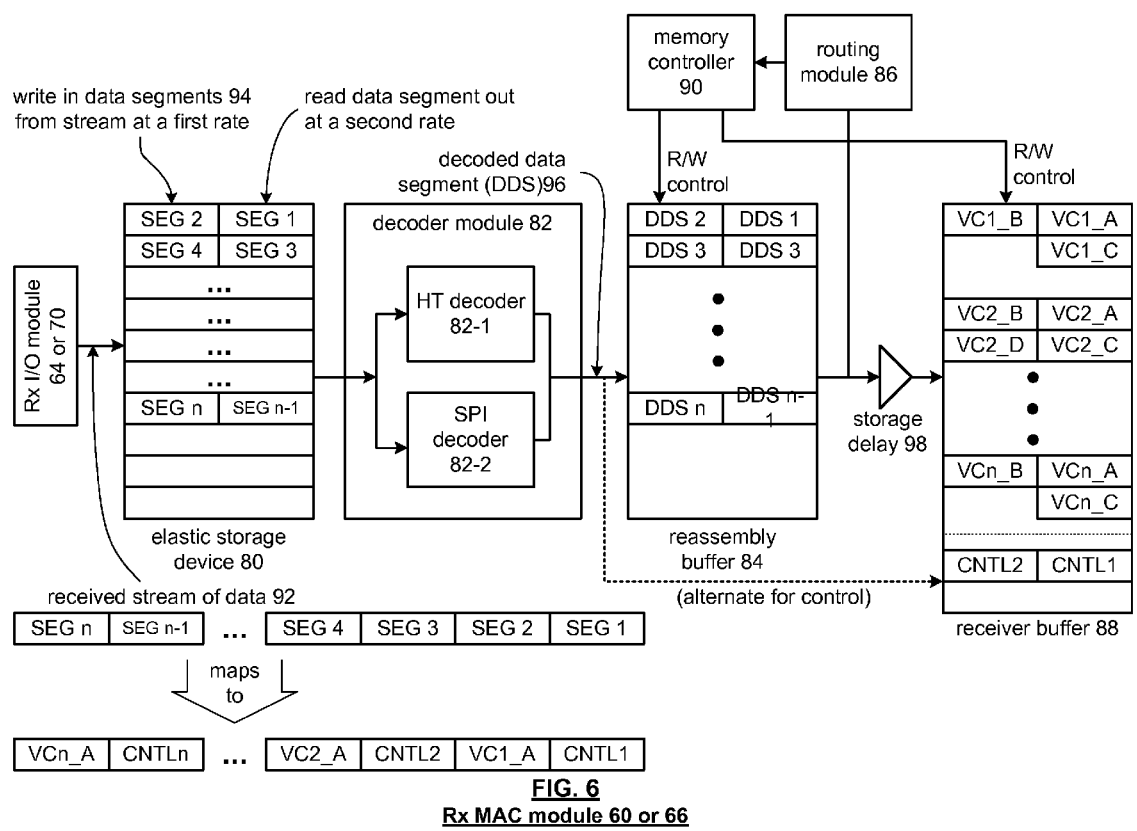
FIG. 6 is a schematic block diagram of a receiver media access control module in accordance with the present invention.

FIG. 6 is a schematic block diagram of a receiver media access control (MAC) module 60 or 68. The receiver MAC module includes an elastic storage device 80, a decoder module 82, a reassembly buffer 84, a storage delay element 98, a receiver buffer 88, a routing module 86, and a memory controller 90. The decoder module 82 may include a HyperTransport (HT) decoder 82-1 and a system packet interface (SPI) decoder 82-2.

The elastic storage device 80 is operably coupled to receive a stream of data 92 from the receiver input/output module 64 or 70. The received stream of data 92 includes a plurality of data segments (e.g., SEG1-SEG n). The data segments within the stream of data 92 correspond to control information and/or data from a plurality of virtual channels. The particular mapping of control information and data from virtual channels to produce the stream of data 92 will be discussed in greater detail with reference to FIG. 7. The elastic storage device 80, which may be a dual port SRAM, DRAM memory, register file set, or other type of memory device, stores the data segments 94 from the stream at a $1^{st}$ data rate. For example, the data may be written into the elastic storage device 80 at a rate of 64 bits at a 400 megahertz rate. The decoder module 82 reads the data segments out of the elastic storage device 80 at a $2^{nd}$ data rate in predetermined data segment sizes (e.g., 8 or 16 byte segments).

The stream of data 92 is partitioned into segments for storage in the elastic storage device 80. The decoder module 82, upon retrieving data segments from the elastic storage device 80, decodes the data segments to produce decoded data segments (DDS) 96. The decoding may be done in accordance with the HyperTransport protocol via the HT decoder 82-1 or in accordance with the SPI protocol via the SPI decoder 82-2. Accordingly, the decoder module 82 is taking the segments of binary encoded data and decodes the data to begin the reassembly process of recapturing the originally transmitted data packets.

The reassembly buffer 84 stores the decoded data segments 96 in a first-in-first-out manner. In addition, if the corresponding decoded data segment 96 is less than the data path segment size (e.g., 8 bytes, 16 bytes, et cetera), the reassembly buffer 84 pads the decoded data segment with the data path segment size. In other words, if, for example, the data path segment size is 8 bytes and the particular decoded data segment 96 is 6 bytes, the reassembly buffer 84 will pad the decoded data segment 96 with 2 bytes of null information such that it is the same size as the corresponding data path segment. Further, the reassembly buffer aligns the data segments to correspond with desired word boundaries. For example, assume that the desired word includes 16 bytes of information and the boundaries are byte 0 and byte 15. However, in a given time frame, the bytes that are received correspond to bytes 14 and 15 from one word and bytes 0-13 of another word. In the next time frame, the remaining two bytes (i.e., 14 and 15) are received along with the first 14 bytes of the next word. The reassembly buffer aligns the received data segments such that full words are received in the given time frames (i.e., receive bytes 0 through 15 of the same word as opposed to bytes from two different words). Still further, the reassembly buffer 84 buffers the decoded data segments 96 to overcome inefficiencies in converting high-speed minimal bit data to slower-speed multiple bit data. Such functionality of the reassembly buffer ensures that the reassembly of data packets will be accurate.

The decoder module 82 may treat control information and data from virtual channels alike or differently. When the decoder module 82 treats the control information and data of the virtual channels similarly, the decoded data segments 96, which may include a portion of data from a virtual channel or control information, is stored in the reassembly buffer 84 in a first-in-first-out manner. Alternatively, the decoder module 82 may detect control information separately and provide the control information to the receiver buffer 88 thus bypassing the reassembly buffer 84. In this alternative embodiment, the decoder module 82 provides the data of the virtual channels to the reassembly buffer 84 and the control information to the receiver buffer 88.

The routing module 86 interprets the decoded data segments 96 as they are retrieved from the reassembly buffer 84. The routing module interprets the data segments to determine which virtual channel they are associated with and/or for which piece of control information they are associated with. The resulting interpretation is provided to the memory controller 90, which, via read write controls causes the decoded data segments to be stored in a location of the receiver buffer 88 allocated for the particular virtual channel or control information. The storage delay element 98 compensates for the processing time of the routing module 86 to determine the appropriate storage location within the receiver buffer 88.

The receiver buffer 88 may be a static random access memory (SRAM) or dynamic random access memory (DRAM) and may include one or more memory devices. In particular, the receiver buffer 88 may include a separate memory device for storing control information and separate memory device for storing information from the virtual channels. Once at least a portion of a packet of a particular virtual channel is stored in the receiver buffer 88, it may be routed to an input queue in the packet manager or routed to an output queue for routing, via another interface 54 or 56, as an upstream packet or a downstream packet to another multiple processor device.

FIG. 6 further illustrates an example of the processing performed by the receiver MAC module 60 or 68. In the example, data segment 1 of the received stream of data 92 corresponds with control information CNTL 1. The elastic storage device 80, stores data segment 1, which, with respect to the receiver MAC module, is a set number of bytes of data (e.g., 8 bytes, 16 bytes, et cetera). The decoder module 82 decodes data segment 1 to determine that segment 1 corresponds to control information. The decoded data segment is then stored in the reassembly buffer 84 or provided to the receiver buffer 88. If the decode control information segment is provided to the reassembly buffer 84, it is stored in a first-in-first-out (FIFO) manner. At some later time, the decoded control information segment is read from the reassembly buffer 84 by the routing module 86 and interpreted to determine that it is control information associated with a particular packet or particular control function. Based on this interpretation, the decoded data segment 1 is stored in a particular location of the receiver buffer 88.

Continuing with the example, the $2^{nd}$ data segment (SEG 2) corresponds to a $1^{st}$ portion of data transmitted by virtual channel number 1. This data is stored as binary information in the elastic storage device 80 as a fixed number of binary bits (e.g., 8 bytes, 16 bytes, etc.). The decoder module 82 decodes the binary bits to produce the decoded data segment 96, which, for this example, corresponds to DDS 2. When the decoded data segment (DDS 2) is read from the reassembly buffer 84, the routing module 86 interprets it to determine that it corresponds to a packet transmitted from virtual channel number 1. Based on this interpretation, the portion of receiver buffer 88 corresponding to virtual channel number 1 will be addressed via the memory controller 90 such that the decoded data segment number 2 will be stored, as VC1_A in the receiver buffer 88. The remaining data segments illustrated in FIG. 6 are processed in a similar manner. Accordingly, by the time the data is stored in the receiver buffer 88, the stream of data 92 is decoded and segregated into control information and data information, where the data information is further segregated based on the virtual channels that transmitted it. As such, when the data is retrieved from the receiver buffer 88, it is in a generic format and partitioned based on the particular virtual channels that transmitted it.

Figure 7:
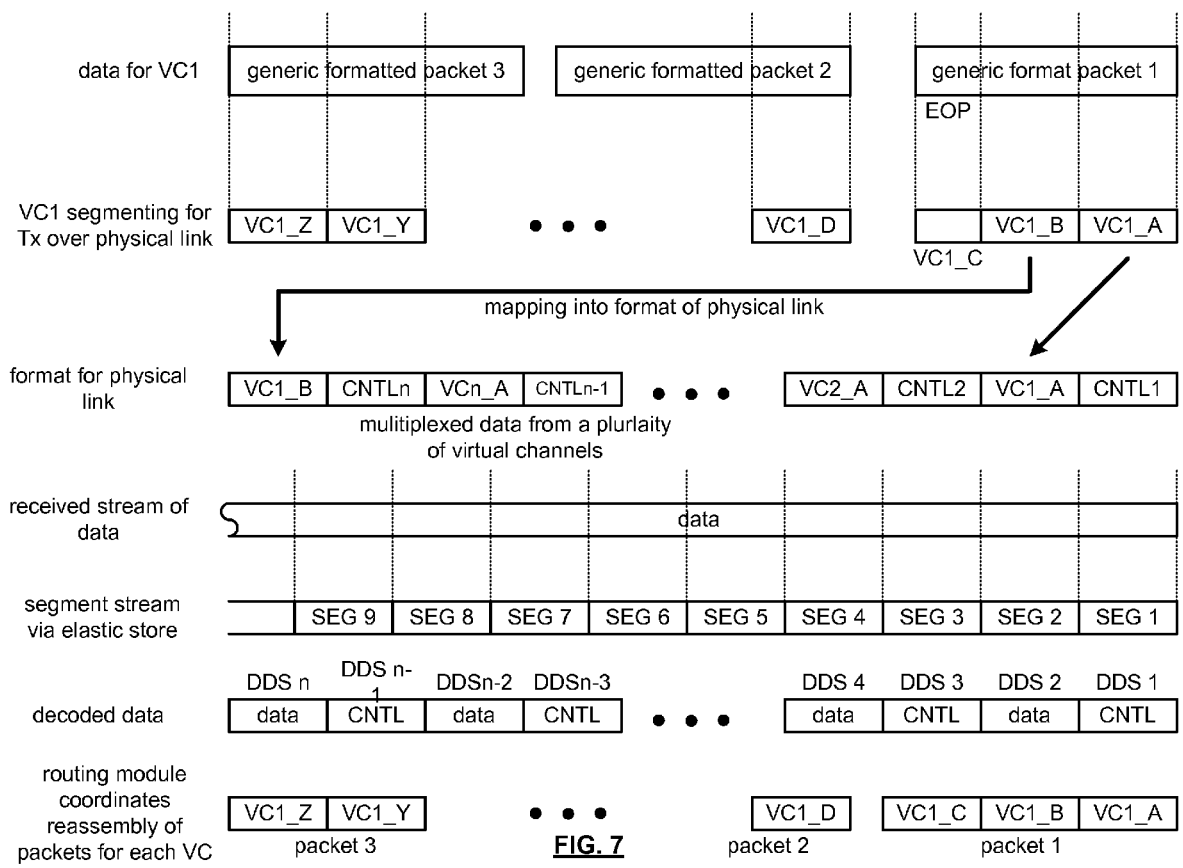
FIG. 7 is a graphical representation of the processing performed by a transmitter media access control module and a receiver media access control module in accordance with the present invention.

FIG. 7 is a graphical representation of the function of the transmit MAC 58 or 68 and the receive MAC modules 60 or 66. The transmit MAC module 58 or 68 receives packets from a plurality of virtual channels via the switching module 51. FIG. 7 illustrates the packets received by the transmit MAC module 58 or 68 from a $1^{st}$ virtual channel (VC1). The data are shown in a generic format, which may correspond to ATM cells, frame relay packets, IP packets, TCP/IP packets, other types of packet switched formatting and/or circuit switched formatting. The transmit MAC module partitions the generically formatted packets into a plurality of data segments of a particular size. For example, the $1^{st}$ data packet of virtual channel 1 is partitioned into three segments VC1_A, VC1_B and VC1_C. The particular size of the data segments corresponds with the desired data path size, which may be 8 bytes, 16 bytes, et cetera.

The $1^{st}$ data segment for packet 1 (VC1_A) will include a start-of-packet indication for packet 1. The $3^{rd}$ data segment of packet 1 (VC1_C) will include an end-of-packet indication for packet 1. Since VC1_C corresponds to the last data segment of packet 1 it may be of a size less than the desired data segment size (e.g., of 8 bytes, 16 bytes, et cetera). When this is the case, the data segment VC1_C will be padded and/or aligned via the reassembled buffer to be of the desired data segment size and aligned along word boundaries. Further note that each of the data segments may be referred to as data fragments. The segmenting of packets continues for the data produced via virtual channel 1 as shown. The transmit MAC module then maps the data segments from the plurality of control virtual channels and control information into a particular format for transmission via the physical link. As shown, the data segments for virtual channel 1 are mapped into the format of the physical link, which provides a multiplexing of data segments from the plurality of virtual channels along with control information.

At the receiver side of the interface 54 or 56 the transmitted data is received as a stream of data. As stated with respect to FIG. 6, the receiver section segments the stream of data and stores it via an elastic storage device. The decoder decodes the segments to determine control and data information. Based on the decoded information, the routing module coordinates the reassembly of the packets for each of the virtual channels. As shown, the resulting data stored in the receiver buffer includes the data segments corresponding to packet 1, the data segments corresponding to packet 2 and the data segments corresponding to packet 3 for virtual channel 1.

Figure 8:
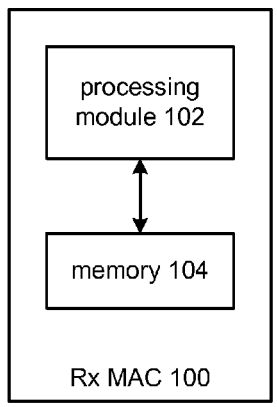
FIG. 8 is a schematic block diagram of an alternate embodiment of a receiver media access control module.

FIG. 8 is a schematic block diagram of a receiver MAC module 100 that includes a processing module 102 and memory 104. The processing module 102 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 104 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 102 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 104 stores, and the processing module 102 executes, operational instructions corresponding to at least some of the steps and/or functions illustrated in FIGS. 9 and 10.

Figure 9:
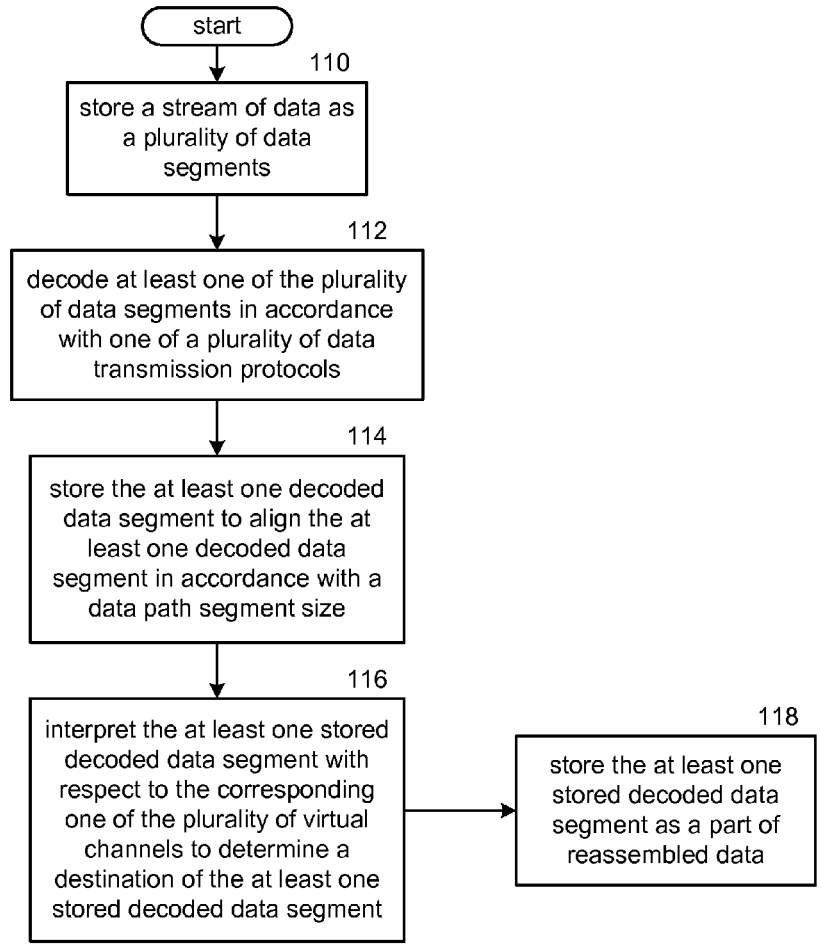
FIG. 9 is a logic diagram of a method for receiving data from a plurality of virtual channels in accordance with the present invention.

FIG. 9 is a logic diagram of a method that may be performed by the receiver MAC module 100 to receive data from a plurality of virtual channels via a physical link. The process begins at Step 110 where the receiver MAC module stores a stream of data as a plurality of data segments. The stream of data includes multiplexed data fragments from at least one of the plurality of virtual channels. A data segment of the plurality of data segments corresponds to one of the multiplexed data fragments. This was graphically illustrated in FIGS. 6 and 7.

The process then proceeds to Step 112 where the receiver MAC module decodes the at least one of the plurality of data segments in accordance with one of a plurality of data transmission protocols to produce a decoded data segment. The decoding may be done in accordance with a HyperTransport protocol, in accordance with a system packet interface protocol, in accordance with a type of packet switched protocol and/or in accordance with a type of circuit switched protocol. The process then proceeds to Step 114 where the receiver MAC module stores the decoded data segment to align and/or pad the decoded data segment in accordance with a data path segment size and/or desired data word boundaries. The decoded data segment may be stored in a $1^{st}$ portion of the reassembly buffer while another decoded data segment is stored in a $2^{nd}$ portion of the entry of the reassembly buffer. The receiver MAC module may interpret a header portion of the decoded data segment to determine whether the decoded data segment is part of a control word regarding associated data, a control word regarding unassociated data or is part of the data word. When the decoded data segment is part of a control word regarding associated data or is part of a data word (e.g., part of a packet transmitted by a virtual channel) the decoded data segment is stored as previously described with reference to FIG. 6. If, however, the decoded data segment is part of a control word regarding unassociated data, the data contained in the data portion is stored as being associated with another decoded data segment (i.e., is associated with a different virtual channel than that of the control word). In other words, if a control header is provided along with unassociated data, the transmitted data portion of the received segment still includes a control section and data section, but the data section includes data that is to be associated with a different data segment.

The process then proceeds to Step 116 where the receiver MAC module interprets a stored decoded data segment with respect to the corresponding one of the plurality of virtual channels to determine a destination of the at least one stored decoded data segment. The storage of the data segment is in accordance with the description provided with FIG. 6. In addition, the determination of the destination may be to a $1^{st}$ input queue of a packet manager as the destination, a $2^{nd}$ input queue of the packet manager or the transmit MAC module may be the destination of the reassembly packet. Such a determination of the destination is generally referred to as a mapping of the input virtual channel that provided the packet to an output virtual channel of the receiving multiple processor device.

The process then proceeds to Step 118 where the receiver MAC module stores the at least one decoded data segment as part of reassembled data packets. Once at least a portion of a data packet is stored in the receiver buffer, it may be forwarded via the switching module 51 to a data manager (e.g., the node controller or packet manager) in accordance with the particular protocol being utilized. For example, when the protocol is in accordance with the SPI protocol, the data packets will generally be transmitted to the packet manager. In contrast, when the protocol is in accordance with the HyperTransport protocol, the data packets will be generally provided to the node controller of the other switch.

Figure 10:
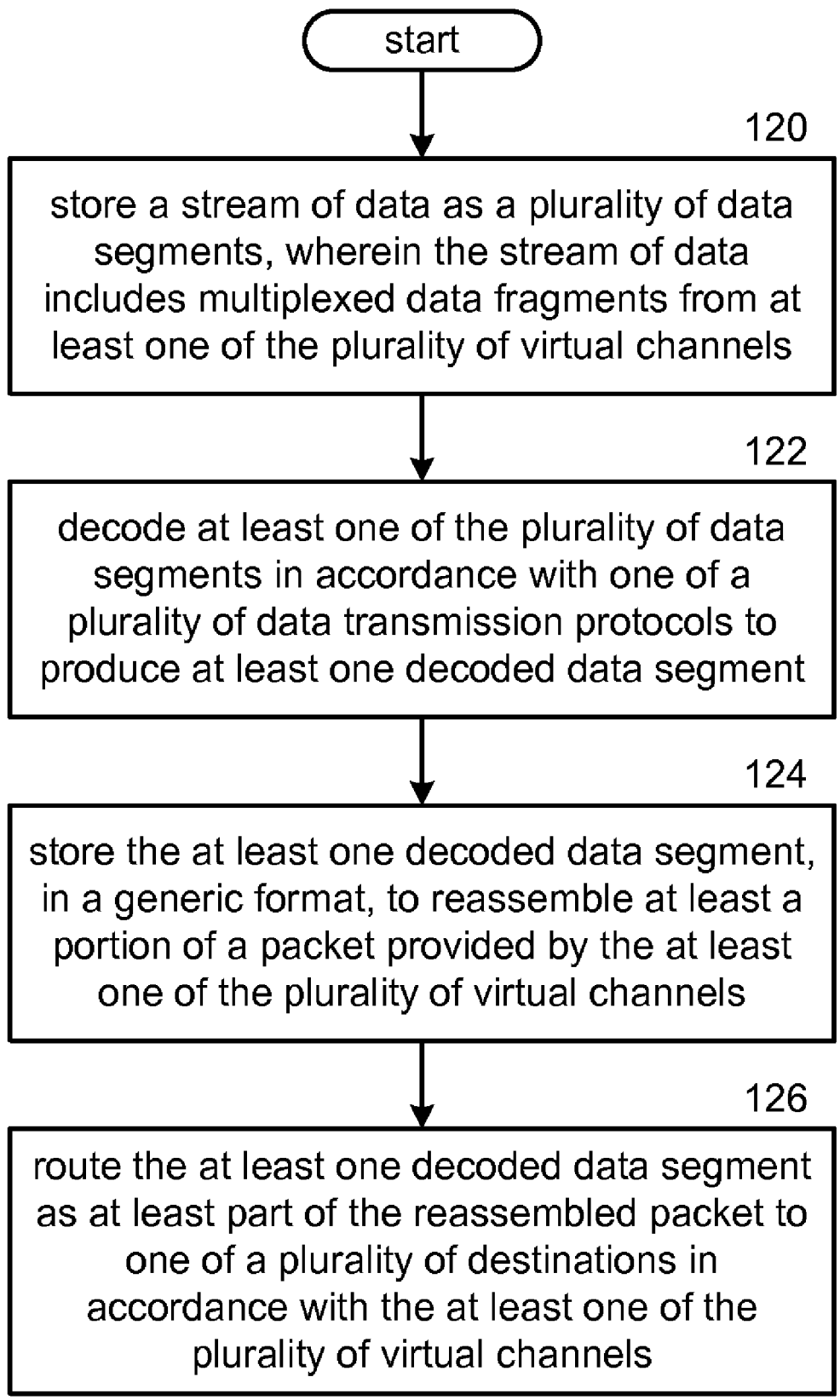
FIG. 10 is a logic diagram of an alternate method for receiving data from a plurality of virtual channels in accordance with the present invention.

FIG. 10 is a logic diagram of an alternate method for receiving data from a plurality of virtual channels by a multiple processor device. The process begins at Step 120 where a receiver MAC module of a multiple processor device stores a stream of data as a plurality of data segments. The stream of data includes multiplex data fragments from at least one of a plurality of virtual channels. A data segment of the plurality of data segments corresponds to one of the multiplex data fragments. This was illustrated in FIGS. 6 and 7.

The process then proceeds to Step 122 where the receiver MAC module decodes at least one of the plurality of data segments in accordance with one of the plurality of data transmission protocols (e.g., HT, SPI, et cetera) to produce at least one decoded data segment. The process then proceeds to Step 124 where the receiver MAC module stores the at least one decoded data segment, in a generic format, to reassemble at least a portion of a packet provided by the at least one of the plurality of virtual channels. The process then proceeds to Step 126 where the receiver MAC module routes the at least one decoded data segment as at least part of the reassembled packet to one of a plurality of destinations in accordance with the at least one of the plurality of virtual channels.

Figure 11:
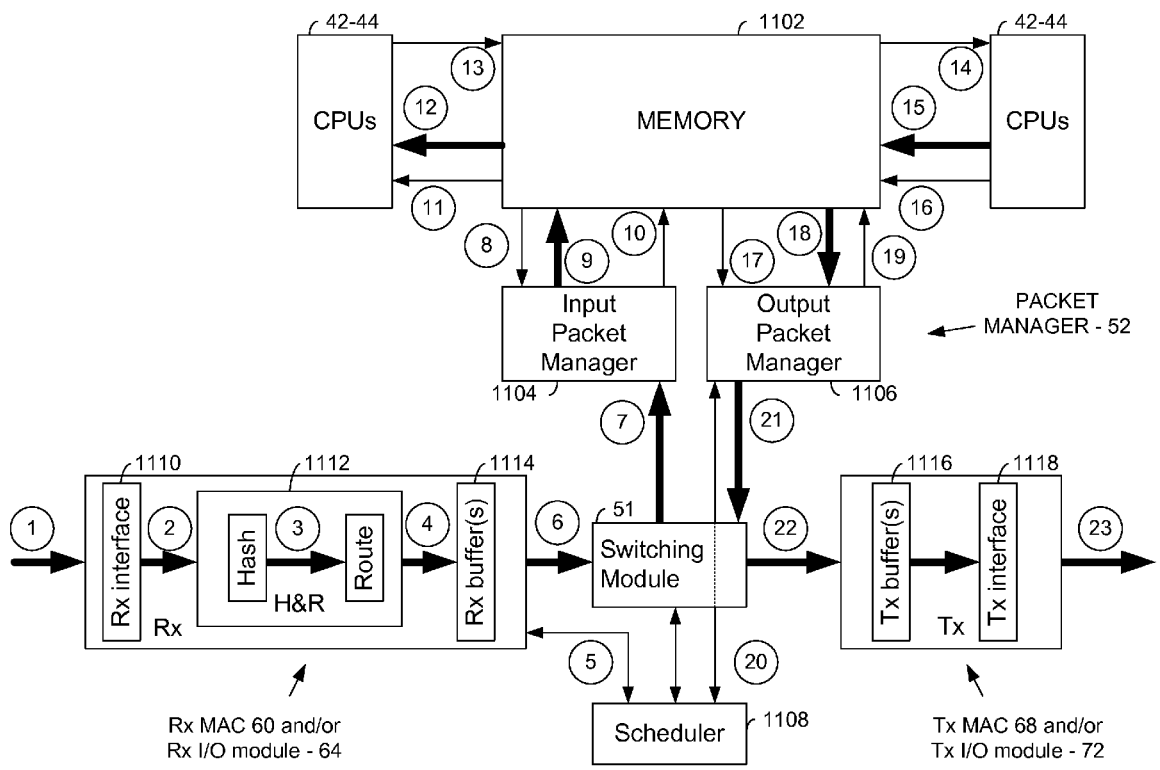
FIG. 11 is a block diagram of the components of the multiple processor device of FIG. 4 that are employed for packet data operations and related description thereof.

FIG. 11 is a block diagram of the components of the multiple processor device of FIG. 4 that are employed for packet data operations and related description thereof. Illustrated in FIG. 11 are the Rx MAC 60/Rx I/O module 64, the switching module 51, an input packet manager 1104 and an output packet manager 1106 of the packet manager 52, memory 1102 (cache memory and/or RAM), the CPUs 42-44, the Tx MAC 68/Tx I/O module 72, and a scheduler 1108.

In FIG. 11, packets (the flow of which are indicated with wide lines and arrows) enter the processor device 40 via Rx I/O module 64/Rx MAC 60 and exit the processor device via Tx MAC 68/Tx I/O module 72. The Rx MAC 60/Rx I/O module 64 includes an Rx interface 1110, a Hash & Route Block 1112, and Rx buffer(s) 1114. The Tx MAC 68/Tx I/O module 72 includes Tx buffer(s) 1116 and a Tx interface 1118. All packets travel through the switching module 51, whether they pass through the processor device 40 directly or are operated upon by the packet manager 52. For the packets written to or read from memory 1102, the packet manager 52 is responsible for reading and writing descriptors (shown with mid-size lines and arrows) related to the packets and using Direct Memory Access operations to write the data to memory or to read the data from memory. The CPUs 42-44 can read and write packets from/to memory and synchronize with the packet manager 52 using descriptors and CSRs. In the example of steps 1-23 of FIG. 11, a packet enters the multiple processor device 40 via a receive HT or SPI-4 port, reaches software, is potentially modified, then sent to another chip through a transmit HT or SPI-4 port. Note that packets can pass through the switching module 51 without being stored in memory or modified by the CPUs 42-44 (skipping steps 7 to 21). Packets can also be sinked by software and not be forwarded (skipping steps 14 to 23) or sourced by software directly (skipping steps 1 to 13).

Packet receive operations occur as follows:

1. The packet arrives through one of the two Rx interfaces (Rx I/O module 64/Rx MAC 60) of the multiple processor device 40. The Rx interfaces can run in SPI-4 mode (native packet mode) or in HT mode, in which case, it uses a special extension called Packet-over-HT (PoHT) to transfer the packets. From a logical perspective, both modes provide almost identical services. The Rx interface deals with the specifics of the protocol and converts the control and data streams into the internal format (not described in this document).

2. The packet is sent to the Hash and Route (H&R) block. The hash block performs the first function of the H&R block. In this operation, the hash block extracts fields from the packet (specific parts of the headers usually) and hashes them if necessary. The hash block provides to the route block a small signature of the packet. Note that the hashing is completely optional and can consist of the simple extraction of a byte from the packet.

3. The route block takes parameters from the packet, e.g., the result of the hash and the input virtual channel, and performs a table look up to determine where the packet should be routed. Not only is the destination block determined (Tx0, Tx1, PMO, see below), but block-specific values like the virtual channel (for a Tx) or the input queue (for the Input Packet Manager 1104) are also output from the route block.

4. While the packet is hashed and routed, it is also stored in the Rx buffer 1114. It will stay there until a routing decision has been made and it is scheduled to its destination block. Note that the packet doesn't need to be entirely stored before being sent to its destination. Typically, if the routing has been determined early, the first data segments can be sent as soon as the data segments been received and processed by the H&R block (typically 64 B).

5. As soon as a block of data from the packet is ready for routing, the Rx sends a request to the switch scheduler 1108. When the block can be scheduled, the switch scheduler 1108 configures the switching module 51 and informs the Rx buffer 1114 that it can start transmitting.

6. The Rx buffer sends the block of data to the switching module 51 and frees up the Rx buffer space for more incoming packet data.

7. In this example, the routing table has determined that the packet should be sent to the packet manager 52 to be processed by software. The input packet manager 1104 receives the packet data from the switch. A specific input queue (IQ) of the input packet manager 1104 is chosen for the packet by the H&R block.

8. To know where to put the packet data, the input packet manager 1104 reads one or more descriptors from main memory (the descriptors might of course reside in L1 or L2 cache memory or may even be currently on a remote node). The descriptors contain the address and sizes of data buffers set aside by software running on CPUs 42-44 to be used for incoming packets. The descriptors are also used as a synchronization mechanism between hardware and software.

9. As soon as the input packet manager 1104 has a buffer to put the packet data into, it starts streaming the packet data to the memory 1102 through the internal bus 48 (once again, the final storage might be in a cache or in main memory).

10. When the input packet manager 1104 is done with the packet, it writes back information about the packet in the descriptor(s) to tell the software running on CPUs 42-44 that it is done with the packet and communicate information about the packet, e.g., its size.

11. The software running on CPUs 42-44 typically waits (i.e. spins) on the descriptors in the various queues and as soon as one is marked ready by the input packet manager 1104, it reads it. The software may also be interrupted by the input packet manager 1104 when a new packet arrives.

12. The packet data is typically read, at least in part, by the software running on the CPUs 42-44 in an attempt to determine how to process the packet data. Note that there is no constraint on which CPUs 42-44 deal with which input queue. There must just be some synchronization between the CPUs 42-44 if input queues are shared.

During the packet processing operations, the software operating on the CPUs 42-44 may perform background tasks. These background tasks include:

13. In the background, software running on the CPUs 42-44 finds free data buffers (typically recycled from packets just transmitted from an output queue) and updates the descriptors in the input queues to provide the input packet manager 1104 with storage for future packets. The software running on the CPUs 42-44 also updates a count field in the input packet manager 1104 to tell it the number of new descriptors added.

14. As in the previous step, the software running on the CPUs 42-44 needs to reclaim output queue descriptors that have been executed by the output packet manager 1106 in order to free the data buffers and potentially use them for IQ descriptors.

During packet transmit operations, the following tasks are performed:

15. When the software running on the CPUs 42-44 wants to send or forward a packet, it needs to write it into a buffer. Depending on the source of the packet data (higher-level software, fragments of input packets . . . ), the software might need to fully copy or create the packet data, modify it or leave it as is.

16. When the packet data is ready, the software will write one or more descriptors in the output queue that has been chosen for the packet. The descriptor(s) contain essentially the address of the buffer where the packet fragments can be found and their size.

17. The output packet manager 1106 waits for descriptors to be ready for transfer in the output queues. The software running on the CPUs 42-44 writes to a special register in the output packet manager 1106 every time it adds new descriptors to be transmitted. Descriptors are read by the output packet manager 1106 to extract the relevant information.

18. When the address where the packet resides at in memory is known to the output packet manager 1106 (through the descriptor(s)), the output packet manager 1106 starts reading it. The output packet manager 1106 has a large buffer equivalent to the Rx buffer, where it prefetches as many outstanding packet blocks as it can, waiting for them to be scheduled for transmission.

19. When the packet has fully left the output packet manager 1106, the output packet manager 1106 writes the descriptor(s) back to confirm that the packet has been transmitted and that its storage in memory can be reused or freed.

20. Each output queue in the output packet manager 1106 sends all of its packets to the same internal destination (block, virtual channel). As soon as the output packet manager 1106 has a full block of data available, it sends a request to the packet scheduler 1108, much like the Rx does in step 5, to schedule transmission of the block. The packet scheduler 1108 arbitrates between the many requests and when a block is scheduled, it changes the connections in the switching module 51 and informs the source (the output packet manager 1106 in this case) that it can transmit the block.

21. As soon as it gets a grant from the scheduler, the output packet manager 1106 transmits the corresponding block of data to the switch. The output packet manager 1106 can then free and reuse the previously allocated storage in the output buffer.

22. The switching module 51 then forwards the block of data to the final destination, the Tx buffer 1116 in this example, as directed by the packet scheduler 1108.

23. The Tx MAC 68/Tx I/O module 72 can run in SPI-4 or HT mode. Its formatter will take the incoming packet data blocks from the switch and will format them according to the mode it is configured in.

FIGS. 12A-12G are logic diagrams illustrating a method for routing of a plurality of data segments within a multiple processor device according to the present invention. The method commences with receiving the plurality of data segments in the form of an input stream of data (step 1200). The input stream of data includes multiplexed data fragments from at least one of a plurality of virtual channels. A data segment of the plurality of data segments corresponds to one of the multiplexed data fragments. Next, at least one evaluation rule is applied to one of the plurality of data segments to produce at least one result corresponding to the one of the plurality of data segments (step 1201). Then, the at least one result is interpreted to determine whether sufficient information is available to render a routing decision for the one of the plurality of data segments (step 1202). Next, it is determined whether there is sufficient information to render a routing decision (step 1203). When there is sufficient information to render a routing decision, routing for the one of the plurality of data segments is determined (step 1204). Then, the routing decision is used to route the data segment to its destination (step 1205). From step 1205, the process proceeds to step 1207-1, where a determination is made as to whether the data segment corresponds to the end of a packet. If so, the packet is transmitted and the process repeats at 1200. If not, the process proceeds to step 1208, which will be described below.

From step 1203, when insufficient information is available to determining routing of the segment, the data segment is stored in a buffer corresponding to the packet in which the data segment was received (step 1206). Further, the at least one result determined at step 1201 is also stored (step 1207). From step 1207, operation proceeds to step 1207-1. When the data segment does not correspond to the end of a packet, the process proceeds to step 1208 where the device waits for another data segment. Once another data segment is available, the process proceeds to step 1209 where a determination is made as to whether the another data segment is associated with a previously processed data segment. If not, the data segment is separately processed per steps 1201-1217 as indicated by step 1212. If so, it is determined whether a routing decision for the previously processed data segment has been rendered (step 1210). If so, the routing decision is applied to the data segment (step 1211) and operation proceeds to step 1207-1. If not, operation proceeds via off-page connector A to FIG. 12B.

Figure 12A:
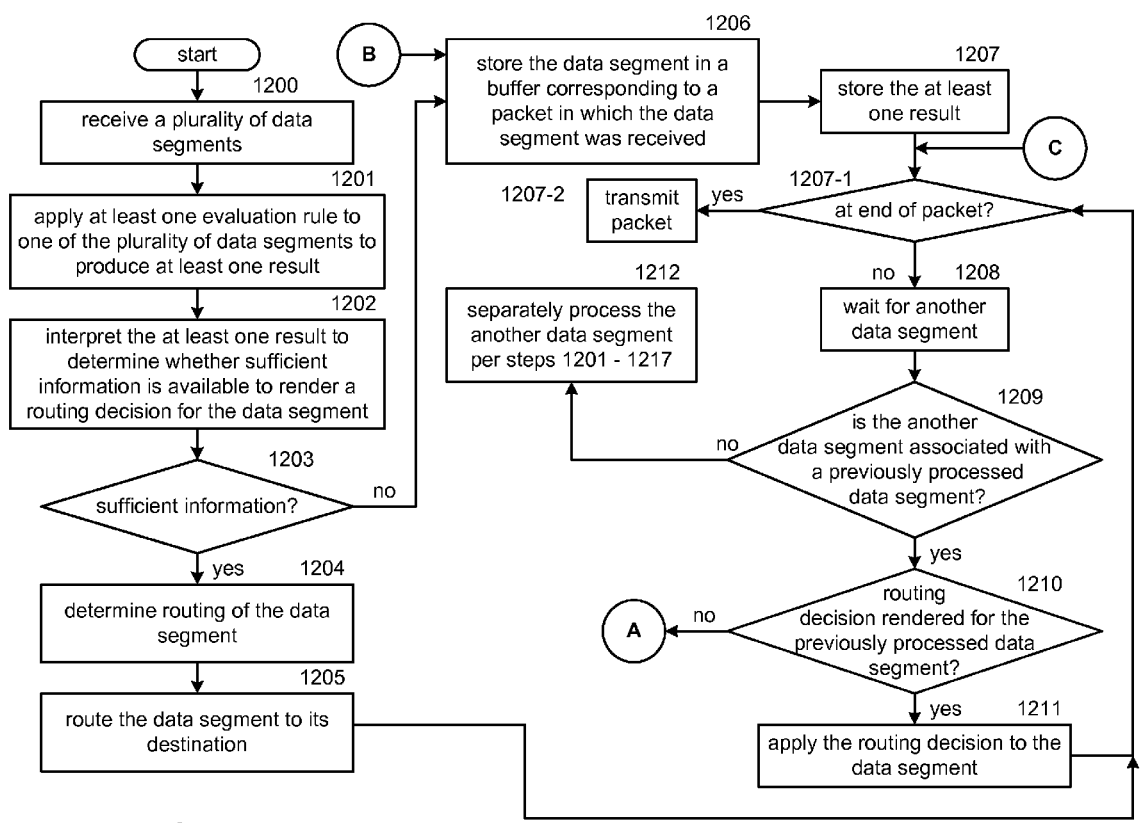
Figure 12B:
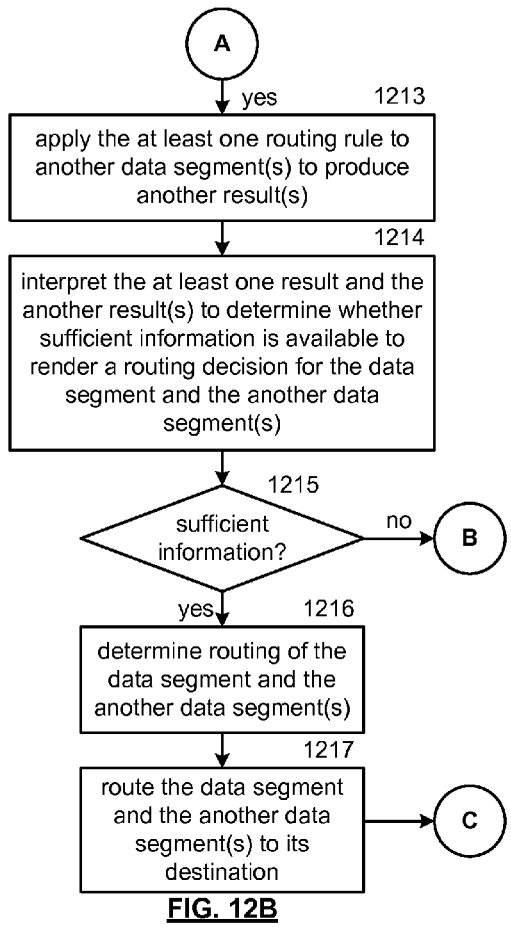

Referring now to FIG. 12B, the method includes applying at least one routing rule to another data segment(s) to produce another result(s) (step 1213). Next, the at least one result and the another result are interpreted to determine whether sufficient information is available to render a routing decision for the data segment and the another data segment(s) (step 1214). If the information is insufficient to render a decision, operation proceeds via off-page connector B to step 1206 of FIG. 12A. If sufficient information has been determined at step 1214, routing for the data segment and the another data segment(s) is determined (step 1216). The data segment and the another data segment(s) are then routed to their destination (step 1217). From step 1217, operation proceeds via off-page connector C to step 1207-1 of FIG. 12A.

Figure 12C:
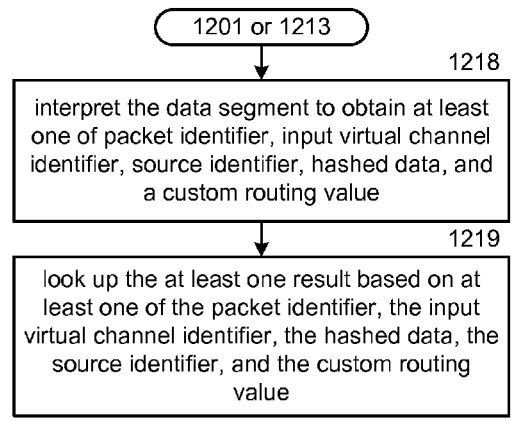

Referring now to FIG. 12C, one embodiment of the operations of step 1201 or step 1213 are described. In particular, with this embodiment, the method includes interpreting the data segment to obtain at least one of packet identifier, input virtual channel identifier, source identifier (e.g., Unit ID, Node ID, etc.), hashed data, and a custom routing value (step 1218). Further, with this embodiment, the method includes looking up the at least one result based on at least one of the packet identifier, the input virtual channel identifier, the hashed data, the source identifier, and the custom routing value (step 1219).

Referring now to FIG. 12D, another embodiment of the operations of step 1201 or step 1213 are described. In particular, with this embodiment, the method includes interpreting the data segment to obtain at least one of packet identifier, input virtual channel identifier, source identifier, hashed data, and a custom routing value (step 1220). Further, with this embodiment, the method includes comparing at least one of the packet identifier, the input virtual channel identifier, the hashed data, the source identifier, and the custom routing value with a corresponding set value to produce the at least one result.

Referring now to FIG. 12E, another embodiment of the operations of step 1221 or are described. The operations of FIG. 12E are employed when virtual channels are used for the transfer of packet data. In such case, the virtual channel value further indicates that the one of the plurality of data segments is associated with a packet that is to be forwarded to a corresponding output virtual channel. With these operations, the method includes comparing the input virtual channel identifier with a virtual channel value that indicates the data segment is associated with a previously identified packet (step 1222). When comparing the input virtual channel identifier with a virtual channel value is favorable (as determined at step 1223), the method includes generating a true virtual channel match value (step 1224). When comparing the input virtual channel identifier with a virtual channel value is unfavorable (as determined at step 1223), the method includes generating a false virtual channel match value (step 1225). From both step 1224 and step 1225 operation proceeds to step 1226. The method there includes determining type of generic packet protocol corresponding to a packet containing the one of the plurality of data segments based on at least one the packet identifier, the source identifier, and the hashed data (step 1226).

When the packet identifier indicates a first type of packet protocol (as determined at step 1227), the method includes generating a first protocol type match value (step 1228). When the packet identifier indicates a second type of packet protocol (as determined at step 1227), the method includes generating a second protocol type match value (step 1229). From each of steps 1228 and 1229, operation proceeds via off-page connector D to FIG. 12F.

Figure 12F:
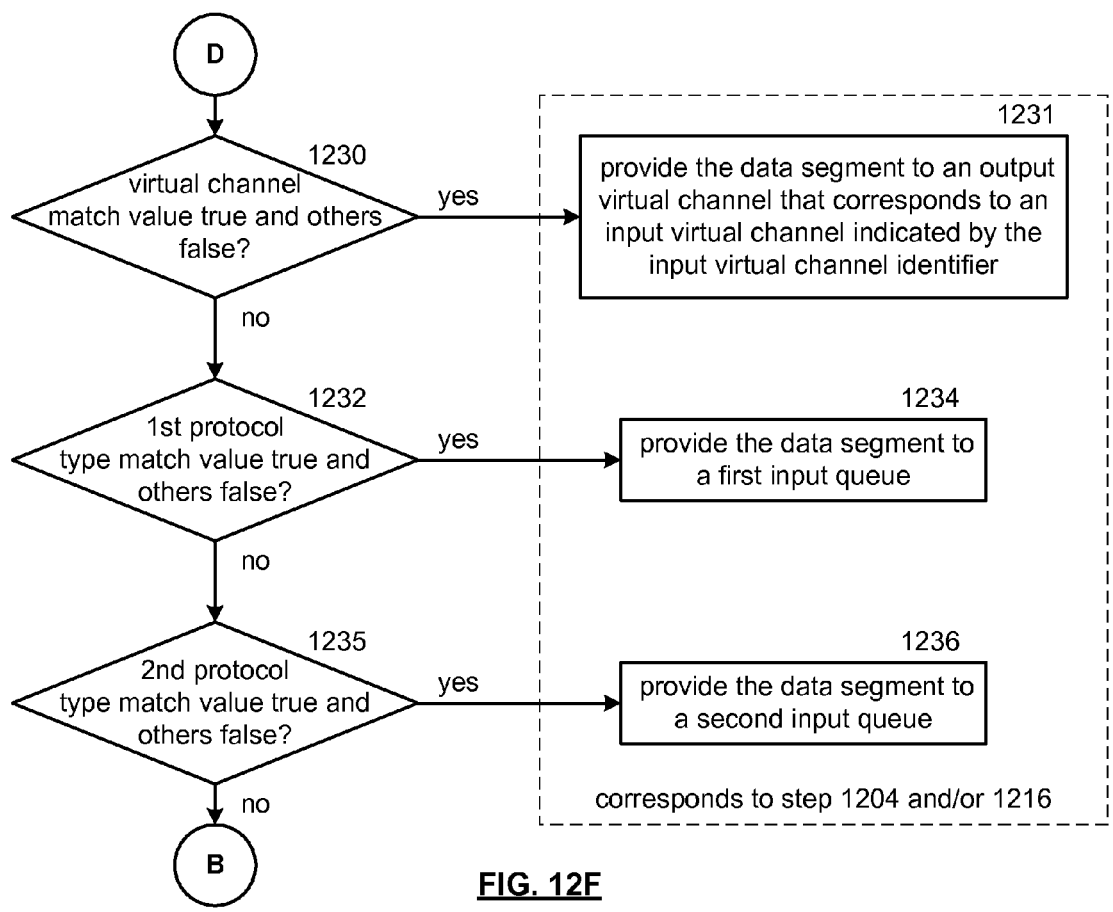

Referring now to FIG. 12F, it is determined whether the virtual channel match value is true and both the first protocol type match value and the second protocol type match value are false (step 1230). If so, the data segment is provided to an output virtual channel that corresponds to an input virtual channel indicated by the input virtual channel identifier (step 1231). If not, it is determined whether the first protocol type match value is true and both the virtual channel match value and the second protocol type match value are false (step 1232). If so, the data segment is provided to a first input queue (step 1234). If not, it is determined whether the second protocol type match value is true and both the virtual channel match value and the first protocol type match value are false (step 1235). If so, the data segment is provided to a second input queue (step 1236). If not, operation proceeds via off-page connector B to step 1206 of FIG. 12A. Note that steps 1231, 1234, and 1236 correspond to step 1204 of FIG. 12A and/or step 1216 of FIG. 12B.

Figure 12G:
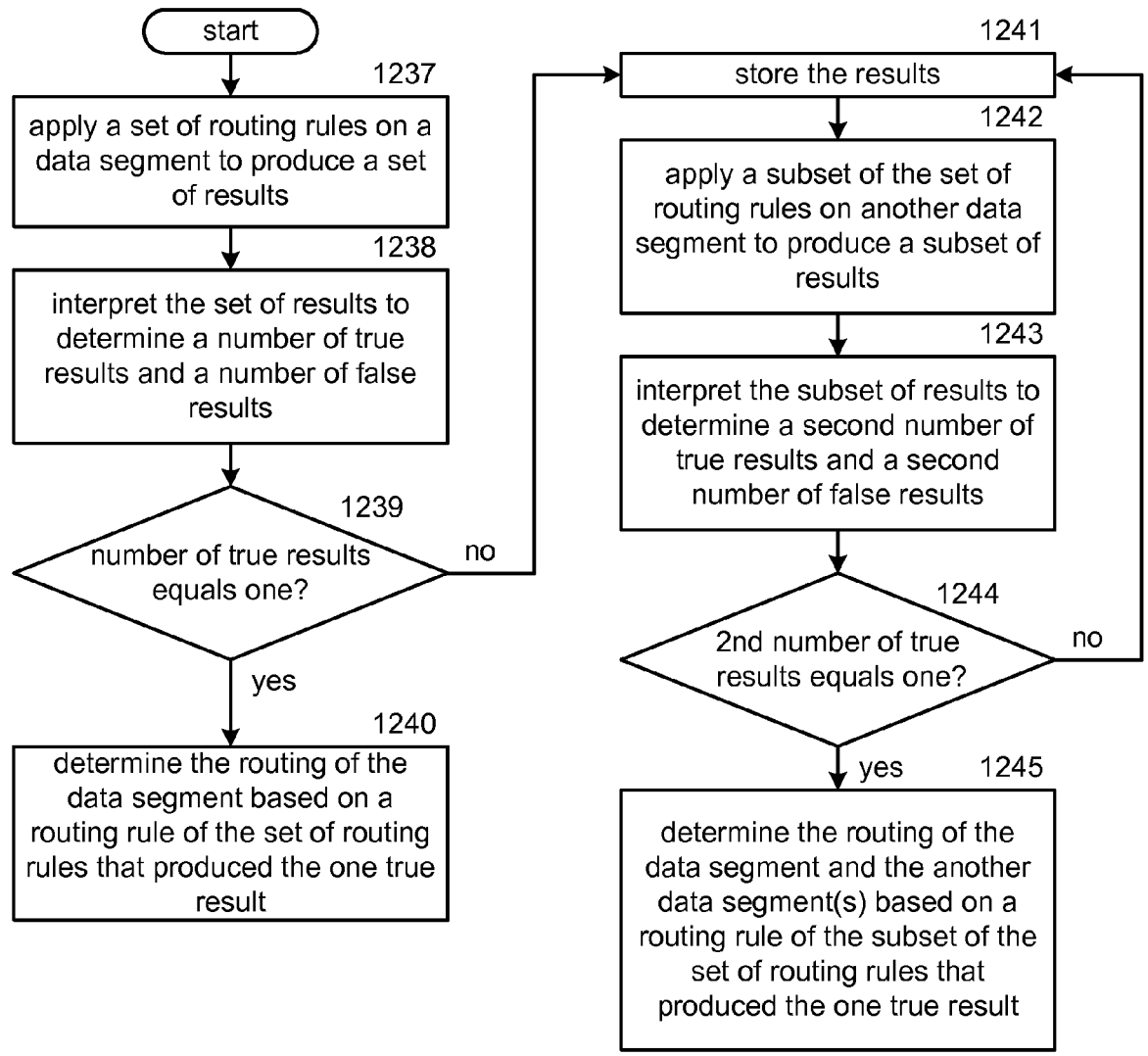

FIG. 12G provides further details of determining routing for a data segment. As a first operation, a set of routing rules is applied on a data segment to produce a set of results (step 1237). Then, the set of results are interpreted to determine a number of true results and a number of false results (step 1238). If the number of true results equals one (as determined at step 1239), the routing of the data segment is determined based upon a routing rule of the set of routing rules that produced the one true result (step 1240).

If the result of the determination at step 1239 is no, the results determined at step 1238 are stored (step 1241). Then, a subset of the set of routing rules are applied on another data segment to produce a subset of results (step 1242). The subset of results are then interpreted to determine a second number of true results and a second number of false results (step 1243). If the second number of true results equals one (as determined at step 1244), the routing of the data segment and the another data segment(s) is determined based on a routing rule of the subset of the set of routing rules that produced the one true result (step 1245). If the second number of true results does not equal one (as determined at step 1244), operation proceeds to step 1241 where the results are stored.

Figure 13:
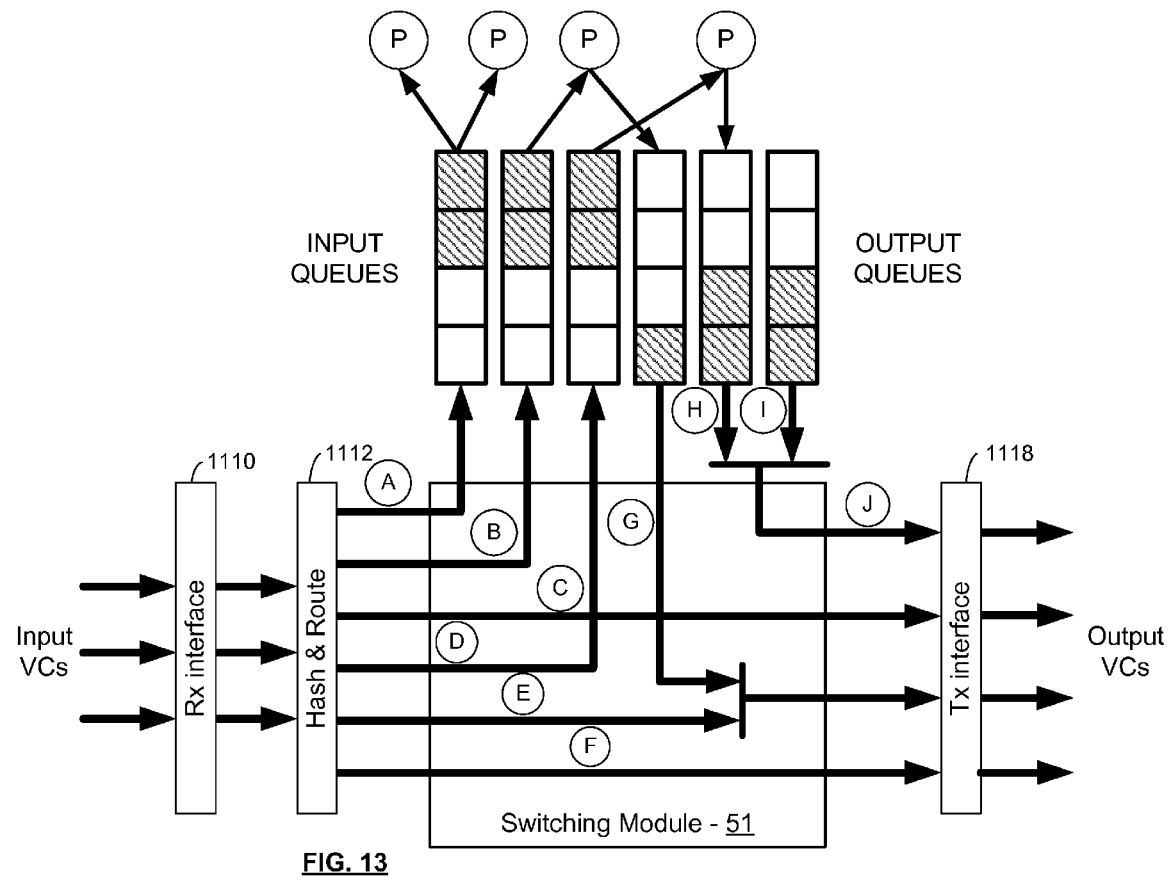
FIG. 13 is a block diagram that is used to describe an example of the manner in which the multiple processor device 40 of the present invention processes packet data.

FIG. 13 is a block diagram that is used to describe an example of the manner in which the multiple processor device 40 of the present invention processes packet data. FIG. 13 includes only one Rx interface 1110 and one Tx interface 1118. However, as the reader will appreciate, additional of these components will be included in a typical device. The Rx interface 1110 receives 3 Virtual Channels (VCs), 1, 2, and 3, and the Tx interface 1118 uses 4 VCs, 4, 5, 6, and 7. From top to bottom in the Rx interface 1110, the H&R block 1112 splits VC into VCs A, B, and C. The switching module 51 routes VC A to a first input queue and routes VC B to another input queue. The switching module 51 also routes VC C to the Tx interface 1118 as VC 5. The H&R block 1112 splits VC 2 into VCs D and E. The H&R block 1112 routes VC D to a third input queue. The switching module 51 combines VC G from a first output buffer with VC E and routes the combined VC to the Tx interface 1118 that outputs the combined VC as VC 6. The H&R block 1112 routes VC 3 to the switching module 51 as VC F. The switching module 51 routes VC F to the Tx interface 1118, which outputs VC F as VC 7. The outputs of a second output queue, VC H, and the output of a third output queue, VC I, are combined as VC J and provided to the Tx interface 1118, which outputs VC J as VC 4.

As is evident from the description of FIG. 13, the output packet manager 1106 can group output queues to go to the same output VC. This is the case for VC H and VC I (which are combined as VC J and output as VC 4). Packets from the two output queues go one after the other, following a certain schedule. As is also evident from the description provided, the switching module 51 can merge flows going to the same output VC. This is the case for VC E and VC G. There is a special packet-boundary-aware logic in the switching module 51 that decides at the end of a packet if it switches input flow for that particular VC. This logic is similar to the grouping logic in the output packet manager 1106. The naming of virtual channels introduced here is purely switch-centric. Input VCs are input to the switching module 51 and output VCs are outputs from the switching module 51. The notion of switch VCs is introduced to help enumerate all the potential independent connections from input to output.

Figures 14A, 14B:
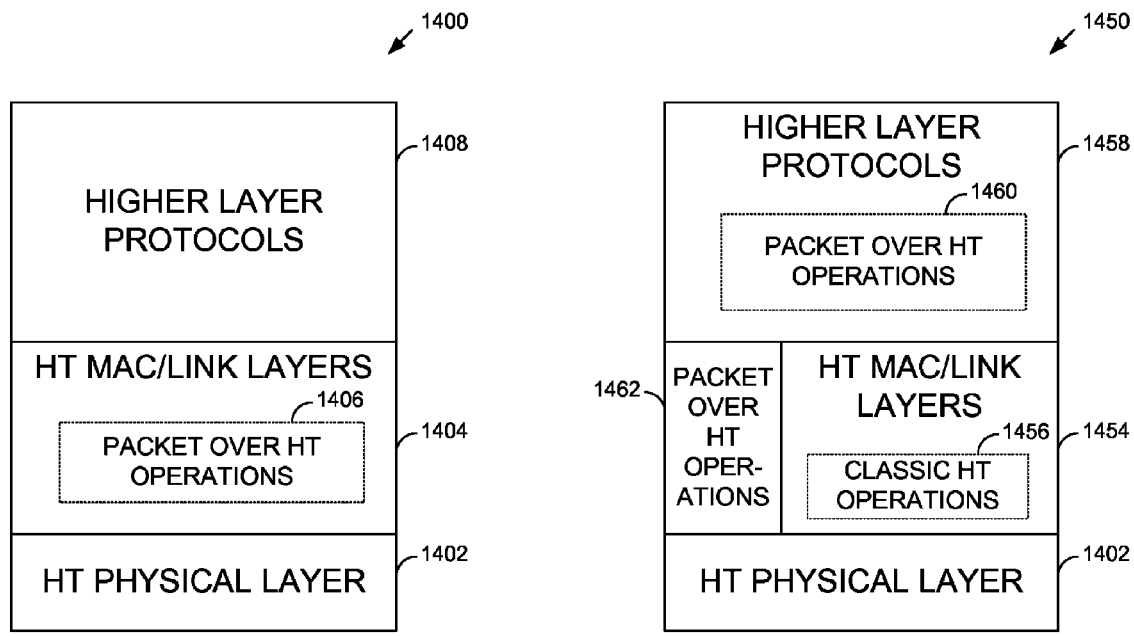
FIG. 14A is a block diagram illustrating protocol layers according to a first embodiment of the present invention.
FIG. 14B is a block diagram illustrating protocols layers according to a second embodiment of the present invention.

FIG. 14A is a block diagram illustrating protocol layers according to a first embodiment of the present invention in which at least a portion of these operations are represented in the HT Standard. With these operations 1400, HT physical layer operations 1402 and HT MAC/LINK layer operations 1404 implement the HT Standards. However, according to the first embodiment of the present invention, new Packet over HT Operations 1406 are introduced into the HT MAC/LINK layer operations 1404. Residing above the HT MAC/LINK layer operations 1404 are higher layer protocols 1408.

Packet over HT operation 1406 includes modifications to the HT MAC/LINK layer 1404 by adding a new generic command to the HT Standard commands. This command is taken from the pool of currently reserved HT commands (see "HyperTransport I/OLink Specification", Hypertransport Organization, Revision 1.03, 10/10/2001 "HT Standard", Table 7, entitled "Command Field Encoding for All Control Packets"). The new command has write semantics in that it includes routing information and associated data. One of the fields of the new command is a virtual channel number, such virtual channel number referencing one of a plurality of virtual channels defined according to the present invention for servicing packet data operations. All transactions on the identified virtual channel must be able to flow even if other HT virtual channels are blocked. Each HT agent along the path of a transaction must ensure that availability of buffers for a transaction on a virtual channel does not depend on the state of the other virtual channels it services, including the PC, NPC, and RSP channels that are also defined in the HT Standard.

In order for the virtual channels that support the packet data transactions to be flow-controlled independently, a new NOP command (i.e., flow control packets to prevent starvation of a virtual channel) is also introduced to the HT Standard that independently releases buffers for each virtual channel. According to another operation of the present invention, transactions serviced by the same virtual channel are strongly ordered if they are in the same I/O stream (as defined in the HT Standard).

The routing of packet data transactions can be done either using the standard, stateless, address-based mechanism defined in the HT Standard or using a new tag scheme of the present invention. With this new tag scheme, each HT agent that performs routing of the packet data includes a routing table that is indexed by the tag. By using the routing table, the HT agents efficiently and quickly route the packet data in both the upstream and downstream directions.

FIG. 14B is a block diagram illustrating protocols layers according to a second embodiment of the present invention. In the embodiment of FIG. 14B, HT physical layer operations 1402 and HT MAC/LINK layer operations 1454 are unaltered. In a first configuration, packet over HT operations 1460 are introduced into higher layer protocol operations 1458. In a second configuration, packet over HT operations 1462 are introduced at the HT MAC/LINK layers 1454. In either configuration, the packet over HT operations 1460 or 1462 work in conjunction with classic HT operations 1456 to service packet data operations.

According to the second embodiment of the present invention as illustrated in FIG. 14B, in servicing packet traffic over HT, multi-channel, optionally strongly ordered, channelized semantics are layered on top/operate in conjunction with classic HT write commands (posted or non-posted). The top part of the address field of the HT write command is used in a traditional manner to route the transaction to its destination.

For example, the destination node may use a base address register to recognize the range of addresses corresponding to packet over HT transmissions. However, the lower part of the address of the HT write command, which is not used for routing purposes, is used to carry additional packet semantics information, including, but not limited to, a virtual channel number, Start-of-Packet indication, End-of-Packet indication, error status flags, byte-accurate packet size, source ID, and additional information that can be used either by software or for routing purposes.

With this fully backward-compatible embodiment, classic HT writes are employed. Thus, the operations of the second embodiment merge the packet buffering with the buffering used by the classic HT write command. With the second embodiment, to support buffer separation between HT I/O traffic and packet traffic, and to fully support channelized packet buffering, a new NOP command may be employed that is used to release packet traffic-specific buffers on one or more virtual channels. With the second embodiment, classic HT write commands that are decoded as packet traffic HT commands must not consume buffers in the virtual channel of a classic HT write, but rather must employ the extended packet traffic buffers that are established to service packet data operations.

With the operations of both the first embodiment of FIG. 14A and the second embodiment of FIG. 14B, data packets that are larger than the maximum payload size of the servicing HT chain must be segmented into cells with an appropriate size. In one operation, the data packets are segmented such that each cell is of the maximum size permitted by the underlying HT transport. However, in such case, the last cell will typically be smaller in size.

In one operation, cells of the segmented packet must be kept in order during transport. Thus, on each virtual channel, cells of the same packet should not be interleaved with cells of another packet. However, at the transport level, cells of packets in different virtual channels may be interleaved. Optionally, the interleaving of cells of different packets on the same virtual channel may be interleaved when necessary as long as the packet cells are appropriately labeled. For example, when interleaving on a single virtual channel is allowed, each cell carried on the virtual channel includes a unique identifier, and at any point in time, there is at most one packet in transit whose packet cells are stamped with that identifier. This feature may be employed to merge several channels into a single virtual channel when the number of virtual channels required by an application is greater than the number of virtual channels directly supported by the hardware. In such case, a higher-level layer must reassemble the packet cells upon receipt.

According to another operation of the present invention, transport-level routing is employed to route from one PoHT aware HT agent (first embodiment) to another PoHT aware HT agent. However, routing within the PoHT agents is left to higher-level routing operations. If all HT agents within a particular HT chain are PoHT-aware, each HT agent will route the PoHT transaction to all directly connected HT agents. If classic HT agents, i.e., non-PoHT aware HT agents, reside in the path of the PoHT transaction, then the transmitting HT agent must know the address of all HT agents to which it can send PoHT transactions via a classic HT fabric. For instance, it is possible to connect PoHT aware HT agents around a non-PoHT aware HT switch by informing each PoHT aware HT agent of the PoHT address ranges of all the other coupled PoHT aware agents. In such case, packet cell interleaving may be successfully performed by a careful allocation of the virtual channels or by having each packet source stamp its cells with a unique source ID that is later used to reassemble the interleaved packet cells.

According to still another aspect of the present invention, higher-level routing functions are performed by examining transport-level information and other information contained in the packet (or packet cell) and then determining routing information based thereon. Methods that may be used in determining routing information based upon the packet information includes hashing functions, random distribution operations, field examination, packet content comparisons, and logic functions, among others. With these operations, each PoHT aware agent applies higher-level routing operations to all packets it receives. The output of the routing function of the PoHT aware agent produces a transport-level address that is used for subsequent routing of the packet (or packet cell).

Still other aspects of the present invention relate to channelized buffering and routing of packetized multi-channel traffic. With these operations, many-to-many mapping may be performed in the routing function. In a receive block of a PoHT aware HT agent, multiple input virtual channels and multiple output virtual channels are represented. The routing function inspects the incoming packets (or packet cells) and buffers the packets on an input virtual channel basis or on an output virtual channel basis. When routing an incoming packet or cell on an input virtual channel basis, the routing function uses the input virtual channel(s) identity in the packet for buffer selection and stores the packet/cell in the appropriate buffer(s). When routing an incoming packet based upon an output virtual channel basis, the routing function investigates the contents of the incoming packet/cell to identify at least respective output virtual channel(s). Then, based upon the identity of the output virtual channel(s), the routing function writes the packet/cell to appropriate output buffer(s). These operations are particularly pertinent in a HT switch that spans multiple HT chains, each of which may have common virtual channel numbers. Thus, with these operations, cell interleaving and Head-of-Line blocking must be managed to avoid improper cell interleaving.

Still other aspects of the present invention relate to channelized buffering and routing of packetized multi-channel traffic. With these operations, many-to-many mapping is performed in the routing function. In a receive block of a PoHT aware HT agent, multiple input virtual channels and multiple output virtual channels are represented. The routing function inspects the incoming packets (or packet cells) and buffers the packets on an input virtual channel basis. Then, in output operations, the routing function examines the relationships between the input virtual channel(s) and output virtual channel(s) for transmit routing. In an alternate embodiment, the packet data is sorted as it is received and stored in buffers corresponding to output virtual channels. Upon transmit operations then, the output virtual channel is known. However, with this operation, cell interleaving and Head-of-Line blocking must be managed differently.

Figure 15:
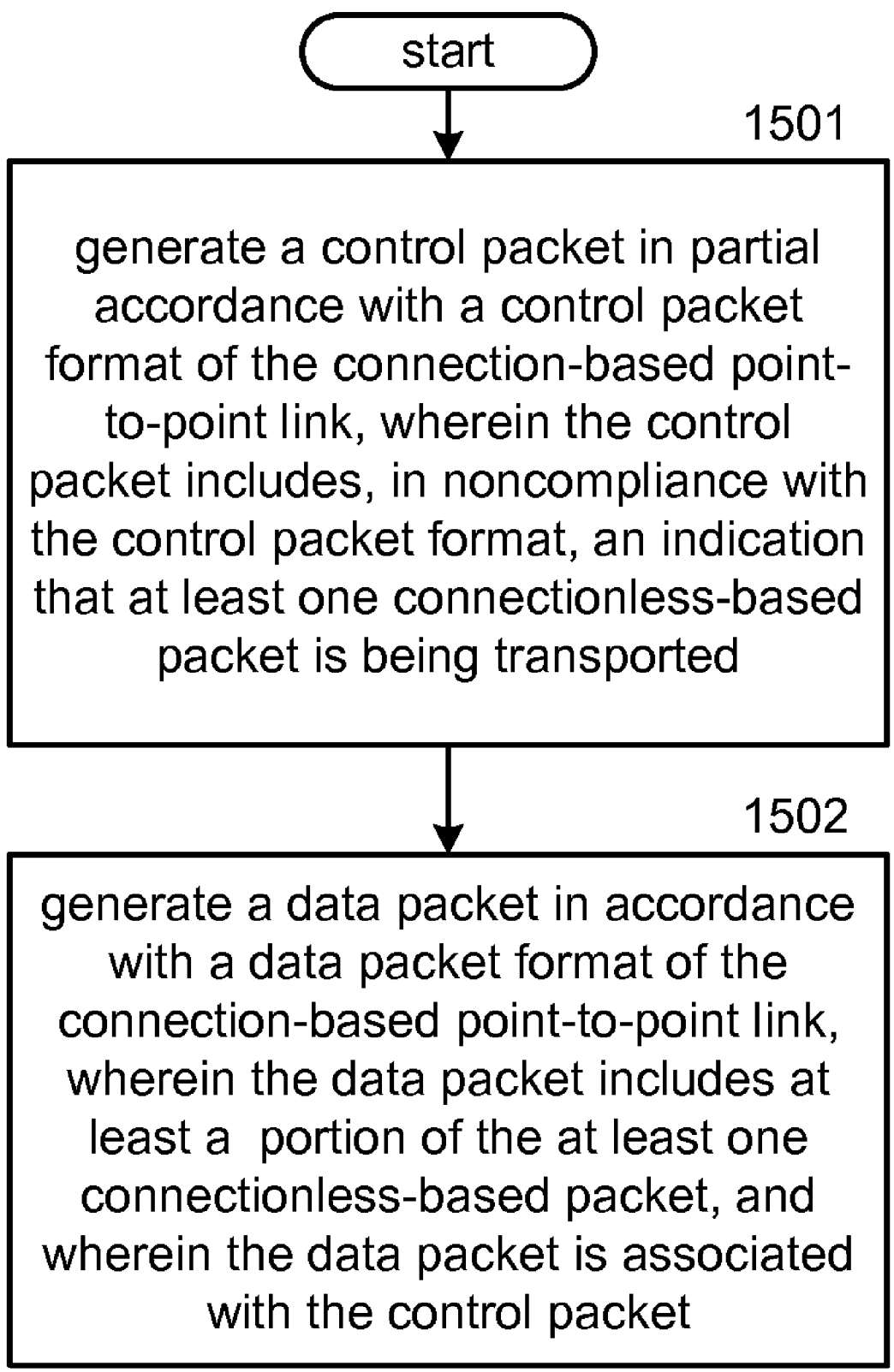
FIG. 15 is a logic diagram of a method for providing connectionless-based packets over a connection-based point-to-point link in accordance with the present invention.

FIG. 15 is a logic diagram of a method for providing connectionless-based packets (e.g., packets formatted as previously described as being in the generic format) over a connection based point-to-point link (e.g., HT link). The method begins at step 1501, where a multiple processor device via one of its interface modules 54 and/or 56 generates a control packet in partial accordance with a control packet format of the connection-based point-to-point link. The control packet includes, in noncompliance with the control packet format, at least one of an indication that at least one connectionless-based packet is being transported, an indication of a virtual channel of a plurality of virtual channels associated with the at least one connectionless-based packet, an indication of an amount of data included in the data packet, status of the at least one connectionless-based packet, and an error status indication. The status includes one or more of a start of packet indication for the at least one connectionless-based packet, an end of packet indication for the at least one connectionless-based packet, a middle of packet indication for the at least one connectionless-based packet, and an indication of a number of valid bytes in a data packet associated with a control packet that includes the end of packet indication The process then proceeds to step 1502 where the interface module generates a data packet in accordance with a data packet format of the connection-based point-to-point link, where the data packet includes at least a portion of the at least one connectionless-based packet, and wherein the data packet is associated with the control packet.

FIG. 16 illustrates a control packet 1600 in accordance with the present invention. In general, the control packet 1600 is a sized write control packet as defined in the HT standard with modifications to facilitate connectionless-based packets (e.g., IP packets, TCP/IP packets, ATM cells, etc.) being transported over HT links. The command field (Cmd) is unchanged from the HT standard and is used to indicate that the control packet is a sized write control packet. The virtual channel identification field (VC-ID) replaces the sequence identification field (SeqID) of the HT compliant sized write command. The virtual channel identification field is used to indicate which of the plurality of virtual channels is associated with (e.g., a source or destination) of the data.

The passPW field is unchanged from the HT standard and is used to indicate that the current transaction may be passed on the posted command channel. In an embodiment of the present invention, this field is set to allow the passing of transactions on the posted command channel. The packet over HT source field (PoHT Source) replaces the source tag/reserved field (SrcTag/Rsv) field of the HT specification. This field is used as desired (e.g., to identify a source of the packet, etc.) and will be passed by any legacy devices. The compatibility (cmpt) field is unchanged from the HT specification and in one embodiment is set to zero. The mask count field is unchanged from the HT specification and hence is used in accordance with the specification.

The address section of the sized write control packet of the HT specification has been modified as shown in FIG. 16 to include a status field, a node identification field, and a packet over HT (PoHT) indication. By selecting a value for the PoHT indication that is outside the address range of the multiple processor device and/or the processing system, multiple processor devices in the system that are not PoHT aware will process the modified control packet as a sized write control packet for some other multiple processor device and pass it and the associated data packet along. The status field, which is part of the out of range address, includes a start of packet indication when the data in the associated data packet corresponds to the start of the connectionless-based packet (e.g., IP packet, TCP/IP packet, ATM cell, etc.) being transported. The status field includes a middle of packet indication when the data in the associated data packet corresponds to the middle (i.e., not the start or the end) of the connectionless-based packet. The status field includes an end of packet indication when the data in the associated data packet corresponds to the end of the connectionless-based packet.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for providing transport of connectionless-based packets over a connection-based point-to-point link, the method comprises:

generating a control packet in partial accordance with a control packet format of the connection-based point-to-point link to facilitate transport of a connectionless-based packet, wherein the control packet includes, in noncompliance with the control packet format, an indication that the connectionless-based packet is being transported;

generating a data packet in accordance with a data packet format of the connection-based point-to-point link, wherein the data packet includes at least a portion of the connectionless-based packet, and wherein the data packet is associated with the control packet; and transporting the connectionless-based packet over the connection-based point-to-point link.

2. The method of claim 1, wherein the generating the control packet further comprises at least one of:

providing an indication of a virtual channel of a plurality of virtual channels associated with the connectionless-based packet;

identifying a source of at least one of the control packet and the data packet;

identifying a destination of at least one of the control packet and the data packet;

providing an indication of an amount of data included in the data packet;

providing status of the connectionless-based packet; and providing an error status indication.

3. The method of claim 2, wherein the status of the at least one connectionless-based packet further comprises:

a start of packet indication for the connectionless-based packet;

an end of packet indication for the connectionless-based packet;

a middle of packet indication for the connectionless-based packet; and an indication of a number of valid bytes in a data packet associated with a control packet that includes the end of packet indication.

4. The method of claim 1, wherein the connection-based point-to-point link further comprises a HyperTransport (HT) link.

5. The method of claim 4, wherein the generating the control packet further comprises:

generating a write command in partial accordance with a write command format of the HT link, wherein a portion of an address section of the write command format includes a unique address that indicates that the at least one connectionless-based packet is being transported, such that when a device that is not packet over HT aware forwards the control packet and the data packet in accordance with an HT link protocol and such that when a device is packet over HT aware processes the control packet and data packet.

6. The method of claim 5, wherein the generating the control packet further comprises:
 generating a sequence identification field within the control packet to indicate an identity of a virtual channel of a plurality of virtual channels associated with the connectionless-based packet.

7. The method of claim 5, wherein the generating the control packet further comprises:
 generating a second portion of the address section to indicate status of the connectionless-based packet.

8. The method of claim 7, wherein the status of the connectionless-based packet further comprises:
 a start of packet indication for the connectionless-based packet;
 an end of packet indication for the connectionless-based packet;
 a middle of packet indication for the connectionless-based packet; and
 an indication of a number of valid bytes in a data packet associated with a control packet that includes the end of packet indication.

9. The method of claim 4 further comprises:
 generating at least one flow control packet to release at least one buffer for at least one of a plurality of virtual channels.

10. The method of claim 1 further comprises:
 determining whether each device in a path to each destination of at least one of the control packet and the data packet is packet over connection-based link aware;
 when each device in a path to each destination is packet over connection-based link aware, directly routing the at least one of the control packet and the data packet to the each destination; and
 when at least one device in at least one path is not packet over connection-based link aware, routing the at least one of the control packet and data packet around the at least one device in the at least one path.

11. A method for processing connectionless-based packets transported over a connection-based point-to-point link, the method comprises:
 receiving a control packet via the connection-based point-to-point link;
 determining whether the control packet includes data corresponding to at least one connectionless-based packet in noncompliance with a standard packet format of the control packet; and
 when the control packet includes the data corresponding to the at least one connectionless-based packet, processing the control packet as a connectionless-based packet.

12. The method of claim 11, wherein the determining whether the control packet includes data corresponding to the at least one connectionless-based packet further comprises:
 interpreting an address portion of the control packet to determine whether the address portion contains a unique address that indicates that the at least one connectionless-based packet is being transported.

13. The method of claim 11, wherein the processing the control packet further comprises:
 determining routing information by at least one of hashing function, random distribution operation, field examination, packet content comparison, and logic function.

14. The method of claim 13, wherein the determining the routing information further comprises:
 determining a many-to-many mapping of a plurality of input virtual channels to a plurality of output virtual channels based on at least one of an input virtual channel basis or an output virtual channel basis, wherein the input virtual channel basis utilizes identify of at least one of the plurality of input virtual channels to identify at least one of the plurality of output virtual channels, and wherein the output virtual channel basis uses identity of an output virtual channel of the plurality of output virtual channels to route the control packet to an appropriate output buffer.

15. An apparatus for providing transport of connectionless-based packets over a connection-based point-to-point link, the apparatus comprises:
 processing module; and
 memory operably coupled to the processing module, wherein the memory includes operational instructions that cause the processing module to:
  generate a control packet in partial accordance with a control packet format of the connection-based point-to-point link to facilitate transport of a connectionless-based packet, wherein the control packet includes, in noncompliance with the control packet format, an indication that a connectionless-based packet is being transported; and
  generate a data packet in accordance with a data packet format of the connection-based point-to-point link, wherein the data packet includes at least a portion of the connectionless-based packet, and wherein the data packet is associated with the control packet; and
  transport the connectionless-based packet over the connection-based point-to-point link.

16. The apparatus of claim 15, wherein the memory further comprises operational instructions that cause the processing module to generate the control packet by at least one of:
 providing an indication of a virtual channel of a plurality of virtual channels associated with the connectionless-based packet;
 identifying a source of at least one of the control packet and the data packet;
 identifying a destination of at least one of the control packet and the data packet;
 providing an indication of an amount of data included in the data packet;
 providing status of the connectionless-based packet; and
 providing an error status indication.

17. The apparatus of claim 16, wherein the status of the connectionless-based packet further comprises:
 a start of packet indication for the connectionless-based packet;
 an end of packet indication for the connectionless-based packet;
 a middle of packet indication for the connectionless-based packet; and
 an indication of a number of valid bytes in a data packet associated with a control packet that includes the end of packet indication.

18. The apparatus of claim 15, wherein the connection-based point-to-point link further comprises a HyperTransport (HT) link.

19. The apparatus of claim 18, wherein the memory further comprises operational instructions that cause the processing module to generate the control packet by:
 generating a write command in partial accordance with a write command format of the HT link, wherein a portion of an address section of the write command format includes a unique address that indicates that the connectionless-based packet is being transported, such that when a device that is not packet over HT aware forwards the control packet and the data packet in accordance with an HT link protocol and such that when a device is packet over HT aware processes the control packet and data packet.

20. The apparatus of claim 19, wherein the memory further comprises operational instructions that cause the processing module to generate the control packet by:

generating a sequence identification field within the control packet to indicate an identity of a virtual channel of a plurality of virtual channels associated with the connectionless-based packet.

* * * * *

UNITED STATES PATENT AND TRADEMARK OFFICE
CERTIFICATE OF CORRECTION

PATENT NO. : 8,208,470 B2  
APPLICATION NO. : 12/573754  
DATED : June 26, 2012  
INVENTOR(S) : Manu Gulati et al.

Page 1 of 1

It is certified that error appears in the above-identified patent and that said Letters Patent is hereby corrected as shown below:

In the Claims:

Col. 30, line 1, in claim 14: after "channel basis utilizes" replace "identify" with --identity--

Signed and Sealed this  
Third Day of September, 2013

Teresa Stanek Rea  
*Acting Director of the United States Patent and Trademark Office*